US011281377B2

(12) United States Patent
Yan et al.

(10) Patent No.: US 11,281,377 B2
(45) Date of Patent: Mar. 22, 2022

(54) METHOD AND APPARATUS FOR MANAGING STORAGE SYSTEM

(71) Applicant: EMC IP Holding Company LLC, Hopkinton, MA (US)

(72) Inventors: Bob Biao Yan, Jinjiang Zone (CN); Bernie Bo Hu, Chengdu (CN); Jia Huang, Chengdu (CN); Jessica Jing Ye, Chengdu (CN); Vicent Qian Wu, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/857,691

(22) Filed: Apr. 24, 2020

(65) Prior Publication Data

US 2020/0249849 A1 Aug. 6, 2020

Related U.S. Application Data

(62) Division of application No. 15/622,209, filed on Jun. 14, 2017, now Pat. No. 10,635,323.

(30) Foreign Application Priority Data

Jun. 14, 2016 (CN) .......................... 201610417408.8

(51) Int. Cl.
*G06F 3/06* (2006.01)
*G06F 12/0811* (2016.01)
*G06F 12/128* (2016.01)

(52) U.S. Cl.
CPC ............ *G06F 3/0613* (2013.01); *G06F 3/065* (2013.01); *G06F 3/0647* (2013.01);
(Continued)

(58) Field of Classification Search
CPC .... G06F 3/0685; G06F 3/0653; G06F 3/0635; G06F 2212/283; G06F 2212/601; G06F 12/0871
See application file for complete search history.

(56) References Cited

U.S. PATENT DOCUMENTS 6,442,652 B1 * 8/2002 Laboy ................. G06F 12/0888
455/12.1
7,664,913 B2 * 2/2010 Cassell ................. G06F 3/0689
711/114
(Continued)

FOREIGN PATENT DOCUMENTS

CN 1679004 10/2005
CN 103150122 6/2013
(Continued)

OTHER PUBLICATIONS

De Souter, Marc, et al.; "Logging File System Metadata Changes Using a Single Log Hold Per Cached Block of Metadata," U.S. Appl. No. 14/753,421, filed Jun. 29, 2015.

*Primary Examiner* — Ramon A. Mercado
(74) *Attorney, Agent, or Firm* — BainwoodHuang

(57) ABSTRACT

Embodiments of the present disclosure provide methods, apparatuses and computer program products for managing a storage system. The storage system comprises a plurality of cache devices and a bottom storage device, and the plurality of cache devices comprise a first cache device group and a second cache device group. The method according to an aspect of the present disclosure comprises: receiving an input/output (I/O) request for the storage device; in response to determining that the I/O request triggers caching of target data, storing the target data from the storage device into the first cache device group if the I/O request is a read request; and storing the target data into the second cache device group if the I/O request is a write request. Embodiments of (Continued)

the present disclosure introduce a new architecture for cache devices so that the processing delay is shortened, and/or, the storage capacity can be used more effectively.

19 Claims, 15 Drawing Sheets

(52) U.S. Cl.
CPC .......... *G06F 3/0653* (2013.01); *G06F 3/0685* (2013.01); *G06F 12/0811* (2013.01); *G06F 12/128* (2013.01); *G06F 2212/283* (2013.01); *G06F 2212/621* (2013.01)

(56) References Cited

U.S. PATENT DOCUMENTS

| | | | |
|---|---|---|---|
| 9,864,683 B1 | 1/2018 | Xu et al. | |
| 10,019,362 B1* | 7/2018 | Chatterjee | G06F 3/065 |
| 10,402,096 B2 | 9/2019 | Sen et al. | |
| 2003/0115412 A1* | 6/2003 | Franklin | G06F 3/0601 |
| | | | 711/114 |
| 2005/0188149 A1* | 8/2005 | Kaier | G06F 11/1441 |
| | | | 711/103 |
| 2009/0248871 A1* | 10/2009 | Takase | H04L 47/19 |
| | | | 709/226 |
| 2010/0122252 A1* | 5/2010 | Dasch | G06F 9/5083 |
| | | | 718/100 |
| 2010/0146209 A1* | 6/2010 | Burger | G06F 12/0813 |
| | | | 711/120 |
| 2011/0153965 A1* | 6/2011 | Haustein | G06F 3/0614 |
| | | | 711/162 |
| 2012/0017034 A1* | 1/2012 | Maheshwari | G06F 3/0616 |
| | | | 711/103 |
| 2012/0198152 A1* | 8/2012 | Terry | G06F 11/1092 |
| | | | 711/114 |
| 2013/0179648 A1* | 7/2013 | Yagame | G06F 3/0604 |
| | | | 711/156 |
| 2013/0238851 A1* | 9/2013 | Chang | G06F 12/0895 |
| | | | 711/113 |
| 2013/0268728 A1* | 10/2013 | Ramanujan | G11C 7/1072 |
| | | | 711/105 |
| 2013/0326116 A1* | 12/2013 | Goss | G06F 12/0871 |
| | | | 711/103 |
| 2014/0052939 A1* | 2/2014 | Tseng | G06F 12/00 |
| | | | 711/154 |
| 2014/0201442 A1 | 7/2014 | Rajasekaran et al. | |
| 2014/0297926 A1* | 10/2014 | Ono | G06F 3/0653 |
| | | | 711/103 |
| 2014/0331083 A1* | 11/2014 | Aliev | G06F 11/108 |
| | | | 714/6.23 |
| 2014/0359238 A1* | 12/2014 | Imazaki | C09K 5/16 |
| | | | 711/162 |
| 2015/0089034 A1* | 3/2015 | Stickle | H04L 41/18 |
| | | | 709/223 |
| 2015/0339203 A1 | 11/2015 | Blount et al. | |
| 2017/0003891 A1* | 1/2017 | Arai | G06F 3/0644 |
| 2017/0068457 A1* | 3/2017 | Sunaga | G06F 11/2094 |
| 2017/0097784 A1* | 4/2017 | Iida | G06F 3/0653 |
| 2020/0249849 A1* | 8/2020 | Yan | G06F 3/0685 |

FOREIGN PATENT DOCUMENTS

| | | |
|---|---|---|
| CN | 103678169 | 3/2014 |
| CN | 103827837 | 5/2014 |
| CN | 103902474 | 7/2014 |
| CN | 104794070 | 7/2015 |

* cited by examiner

METHOD AND APPARATUS FOR MANAGING STORAGE SYSTEM

CROSS-REFERENCE TO RELATED APPLICATIONS

This application is a Divisional of U.S. patent application Ser. No. 15/622,209, filed Jun. 14, 2017, which claims the benefit of Chinese Patent Application No. 2016104174088, filed Jun. 14, 2016 at the State Intellectual Property Office, China.

FIELD

Embodiments of the present disclosure generally relate to a storage system, and more specifically to a method and apparatus for a storage system including a fast cache.

BACKGROUND

A cache is a buffer between a bottom storage device (e.g., hard disk) and an external interface. The cache may store for example hot data to reduce data exchange between the external interface and a bottom drive, improve data transmission rate and reduce delay of data access. The cache has a fast access speed, and furthermore, a magnitude and speed of the cache are important factors that will affect transmission rate of a bottom drive.

A fast cache works as a layer 2 (L2) cache, which contains copies of logical blocks resident on bottom physical drives. As an example, the fast cache may be built up by independent solid-state disk (SSD) pairs, which makes it easy to expand and shrink the fast cache. At present, there is still room for improving a storage system including a plurality of cache devices in terms of its architecture, management as well as overall performance.

SUMMARY

Embodiments of the present disclosure provide methods and apparatuses for managing a storage system. A brief summary of embodiments is presented below to provide basic understanding of some aspects of various embodiments. The summary is not intended to identify key points of key elements or describe the scope of various embodiments. On the contrary, content described here is only intended to present some concepts in a simplified form as a prelude to the following more specific depictions.

A first aspect of the present disclosure provides a method for managing a storage system, the storage system comprising a plurality of cache devices and a bottom storage device, the plurality of cache devices comprising a first cache device group and a second cache device group. The method comprises: receiving an input/output (I/O) request for the storage device; in response to determining that the I/O request triggers caching of target data, storing the target data from the storage device into the first cache device group if the I/O request is a read request, and storing the target data into the second cache device group if the I/O request is a write request.

In an embodiment, the method may further comprise: in response to the I/O request being the write request, determining whether a target address of the target data is included in an address mapping of the storage system, the address mapping indicating a mapping between a storage address of the storage device and a caching address of the plurality of cache devices; if it is determined that the target address is not included in the address mapping, writing the target data into the storage device.

In another embodiment, the method may further comprise: if it is determined that the target address is included in the address mapping, determining a target cache device based on the address mapping, and the target cache device includes a caching address in the address mapping that corresponds to the target address. In a further embodiment, the method may further comprise: in response to determining that the target cache device belongs to the first cache device group, removing a mapping for determining the target cache device from the address mapping; and writing the target data into a cache device in the second cache device group. In another embodiment, the method may further comprise: in response to determining that the target cache device belongs to the second cache device group, writing the target data into the target cache device.

In an embodiment, the cache device in the first cache device group comprises a first solid-state disk (SSD) pair, and each SSD of the first SSD pair serves the read request independently.

A second aspect of the present disclosure provides a method of managing a plurality of cache devices, the plurality of cache devices comprising a first cache device group serving a read request and a second cache device group serving a write request. The method comprises: detecting a first request for expanding the plurality of cache devices; in response to detecting the first request, obtaining status information of the plurality of cache devices, the status information indicating at least one of: the load status and usage situation of the storage space; and based on the obtained status information, adding a new cache device other than the plurality of cache devices to the first cache device group or second cache device group.

A third aspect of the present disclosure provides a method of managing a plurality of cache devices in a storage system, the plurality of cache devices comprising a first cache device group serving a read request and a second cache device group serving a write request. The method comprises: detecting a second request for shrinking the cache devices; in response to detecting the second request, removing a first cache device in the first cache device group from the plurality of cache devices, or removing at least one cache device in the second cache device group from the plurality of cache devices by: prohibiting a write operation for the at least one cache device; duplicating a dirty page in the at least one cache device to a storage device in the storage system; and removing the at least one cache device from the second cache device group.

A fourth aspect of the present disclosure provides a method of managing a plurality of cache devices, the plurality of cache devices comprising a first cache device group serving a read request and a second cache device group serving a write request. The method comprises: detecting a third request for balancing the first cache device group and second cache device group; in response to detecting the third request, obtaining status information of the plurality of cache devices, the status information indicating at least one of: load status, online time and usage situation of the storage space of the plurality of cache devices; and performing migration of a cache device between the first cache device group and second cache device group based on the obtained status information of the plurality of cache devices.

A fifth aspect of the present disclosure provides a storage system, comprising: a storage device; a plurality of cache devices, the plurality of cache devices comprising a first cache device group serving a read request and a second cache device group serving a write request; and a storage system manager configured to execute the method according to any aspect of the first aspect to the fourth aspect of the present disclosure.

A sixth aspect of the present disclosure provides a computer program product, comprising at least one computer-readable storage medium having program codes stored thereon, the program codes, when executed by an apparatus, causing the apparatus to execute the method according to any aspect of the first aspect to the fourth aspect of the present disclosure.

The methods, storage system and computer program product according to embodiments of the present disclosure introduce a new architecture for cache devices so that the processing delay is shortened, and/or, the storage capacity can be used more effectively.

Although specific embodiments are illustrated in drawings in an example way, it should be appreciated that depictions of specific embodiments herein are not intended to limit the embodiments to the specific forms disclosed.

BRIEF DESCRIPTION OF THE DRAWINGS

In the disclosure and claims below, objects, advantages and other features of the present disclosure will become more apparent. Here, non-limiting depictions of example embodiments are presented for illustration purposes only with reference to figures, in which:

DETAILED DESCRIPTION OF EMBODIMENTS

Figure 1:
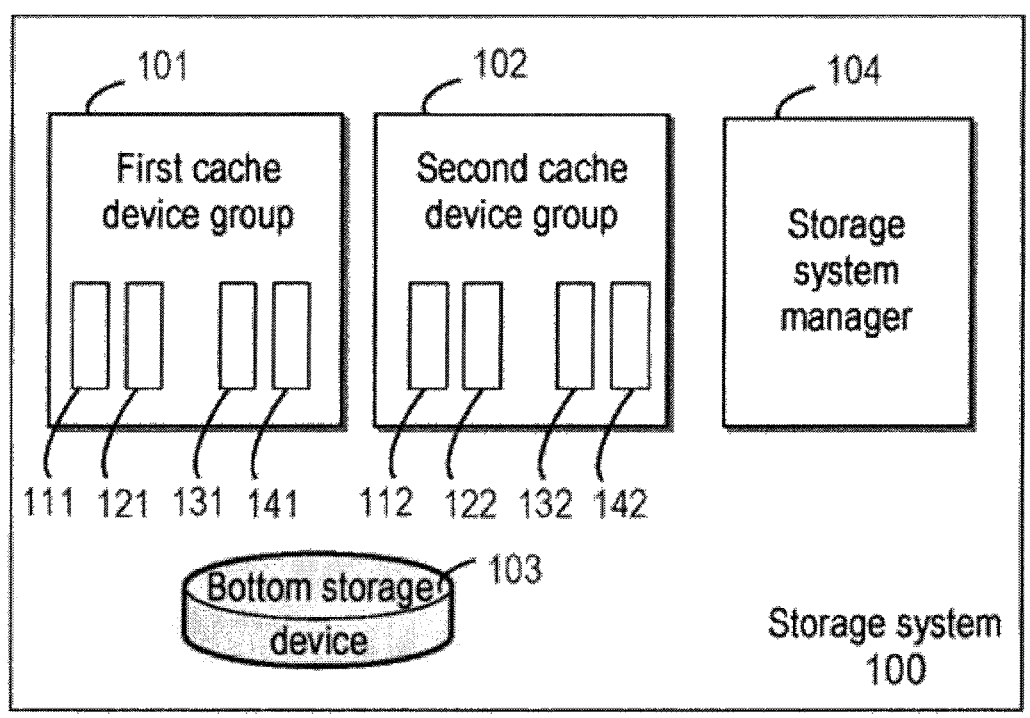
FIG. 1 illustrates a schematic block diagram of a storage system according to an embodiment of the present disclosure.

A lot of details are expounded in the following description for illustration purpose. However, those having ordinary skill in the art will appreciate that embodiments of the present disclosure may be implemented without using these specific details. Hence, the present disclosure is not intended to be limited by the illustrated embodiments, but endowed the broadest scope consistent with principles and features described herein.

It should be appreciated that the terms "first", "second" and the like are only used to distinguish one element from another element. However, in fact, the first element can also be called the second element, vice versa. In addition, it should be appreciated that "comprising" and "including" are only used to illustrate existence of a stated feature, elements, function or component, and do not exclude existence of one or more other features, elements, functions or components.

As stated above, the conventional fast cache may be constructed with an independent SSD pair, e.g., an independent magnetic click redundant array 1 (RAID1) SSD pair. In addition, in a traditional implementation, each SSD pair in the fast cache is treated equally so that each SSD pair may work in a read/write (RW) mode. In this case, the fast cache may be expanded (namely, a new cache device is added to the fast cache) by: triggering the expansion in the selected SSD pair, and expanding each selected SSD pair in the RW mode to the fast cache.

In addition, the fast cache may be shrunk by: triggering the shrink on the selected SSD pair; freezing the write operation on the selected SSD pair; copying (also called flushing in the text below) all the dirty pages in the selected SSD pair to a bottom driver; and removing the selected SSD pair from the fast cache.

In such conventional architecture of the fast cache, there are several problems and drawbacks. For example, all SSD pairs undergo a flushing procedure when being shrunk, and most flushing operation takes a very long time, which brings a terrible experience to the user especially in critical maintenance tasks. Furthermore, all the expensive SSDs in the fast cache work in RAID1 pair mode, which provides 1+1 data protection for write caching, (i.e., a caching unit stores data and another storage unit stores backup of the data); however, this leads to waste of storage for read caching because read caching does not need such data protection.

To solve the above and other potential problems, embodiments of the present disclosure introduce a new architecture for a cache device. An example of the cache device includes, but is not limited to, the SSD pair. According to some embodiments of the present disclosure, a plurality of cache devices (for example, a plurality of cache devices constituting the fast cache or a part thereof) in the storage system comprise at least two groups, e.g., "a first cache device group" and "a second cache device group". Each cache device group comprises at least one cache device. These cache device groups are used for different purposes. For example, the plurality of cache devices may be split into a read/write (RW) group and a read only (RO) group. In another example, the plurality of cache devices may comprise more than two groups, e.g., a read/write (RW) group, a read only (RO) group and a conventional group. The conventional group may have the same properties as the conventional cache devices.

With the new architecture, the plurality of cache devices (e.g., a plurality of SSD pairs) comprises different types for treatment, thereby avoiding performing the same flushing processing for all cache devices and therefore avoiding unnecessary delay, and/or improving the utilization efficiency of the storage space. Several example embodiments of the present disclosure will be described in detail below with reference to figures.

FIG. 1 illustrates a schematic block diagram of a storage system 100 according to an embodiment of the present disclosure. As shown in the figure, the storage system 100 comprises a plurality of cache devices (111, 121, 131, 141 and 112, 122, 132, 142) arranged according to the proposed new architecture. The plurality of cache devices comprise at least a first cache device group 101 and a second cache device group 102. In an example, the first cache device group 101 and second cache device group 102 may be a RO group and an RW group respectively. As shown in FIG. 1, the storage system 100 further comprises a bottom storage device 103 and a storage system manager 104. The bottom storage device 103 may, under control of the storage system manager 104, write (also called "promote") data into the first cache device group 101 or the second cache device group 102. In another embodiment, the storage system manager 104 may control addition (also called expansion in the text below) of a new cache device to the first cache device group 101 or the second cache device group 102, deletion of a cache device from the first cache device group 101 or second cache device group 102, or migration of a cache device between the first cache device group 101 and second cache device group 102, to obtain load balance or enable a storage capacity to be used more sufficiently.

Figure 2:
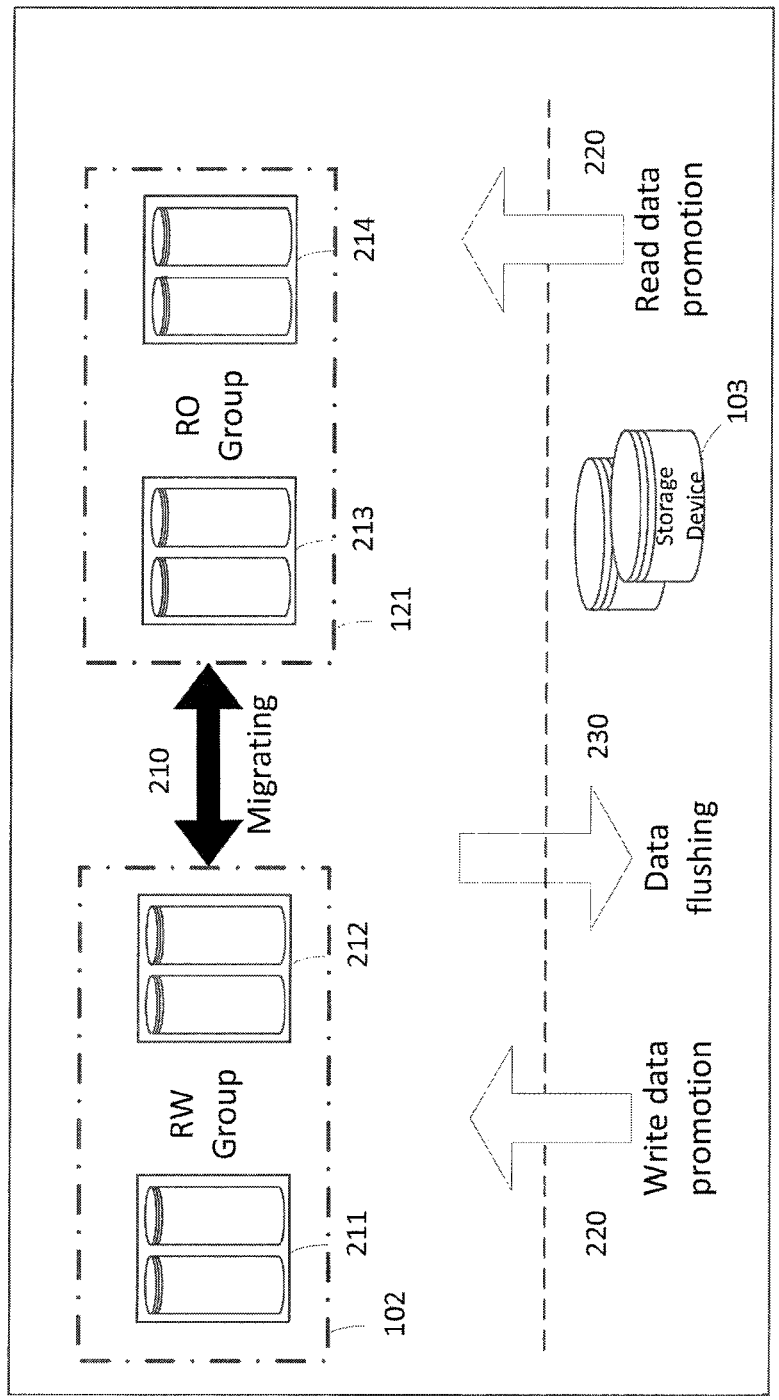
FIG. 2 illustrates a diagram of part of operations in the storage system according to an embodiment of the present disclosure.

FIG. 2 illustrates a diagram of some operations in the storage system 100. Examples of the operations include but are not limited to: migration operation 210 between the first cache device group 101 and the second cache device group, and data flushing operation 230 and data promoting operation 220 between the first cache device group 101 and second cache device group 102 and the bottom storage device (also called "bottom drive" or "bottom storage" hereafter) 103. All the operations shown may be completed by controlling from the storage system manager 104.

In the example of FIG. 2, each cache device is shown as an SSD pair (211, 212, 213, 214), but those skilled in the art may appreciate that embodiments of the present disclosure are not limited thereto. In this example, the second cache device group 102 is RW group, and the SSD pair 211 and 212 therein work in the RAID1 mode, in order to provide an "1+1" write data protection. By default, RW group works as write cache. A data block triggered by a write request will be directed into this RW group during its promotion from the bottom drive into the fast cache. A block promoted to the RW group will continue to serve later write request or read request until it is flushed back to the bottom drive.

In some embodiments, a data block triggered by the read request may be prevented or restricted from being promoted to the 102. In the example in FIG. 2, the bottom drive may be a hard disk drive. The first cache device group 101 shown in FIG. 2 may be a RO group. Although SSDs may be added or removed in pairs, each SSD in the SSD pair (e.g., 213, 214) works independently as read cache. A data block triggered by the read request will be directed into the RO group during its promotion from the bottom drive into the fast cache. The data block promoted to the RO group will continue to serve later read requests before it is out of date. A data block triggered by a write request will not be promoted to the first cache device group 101.

Figure 3A:
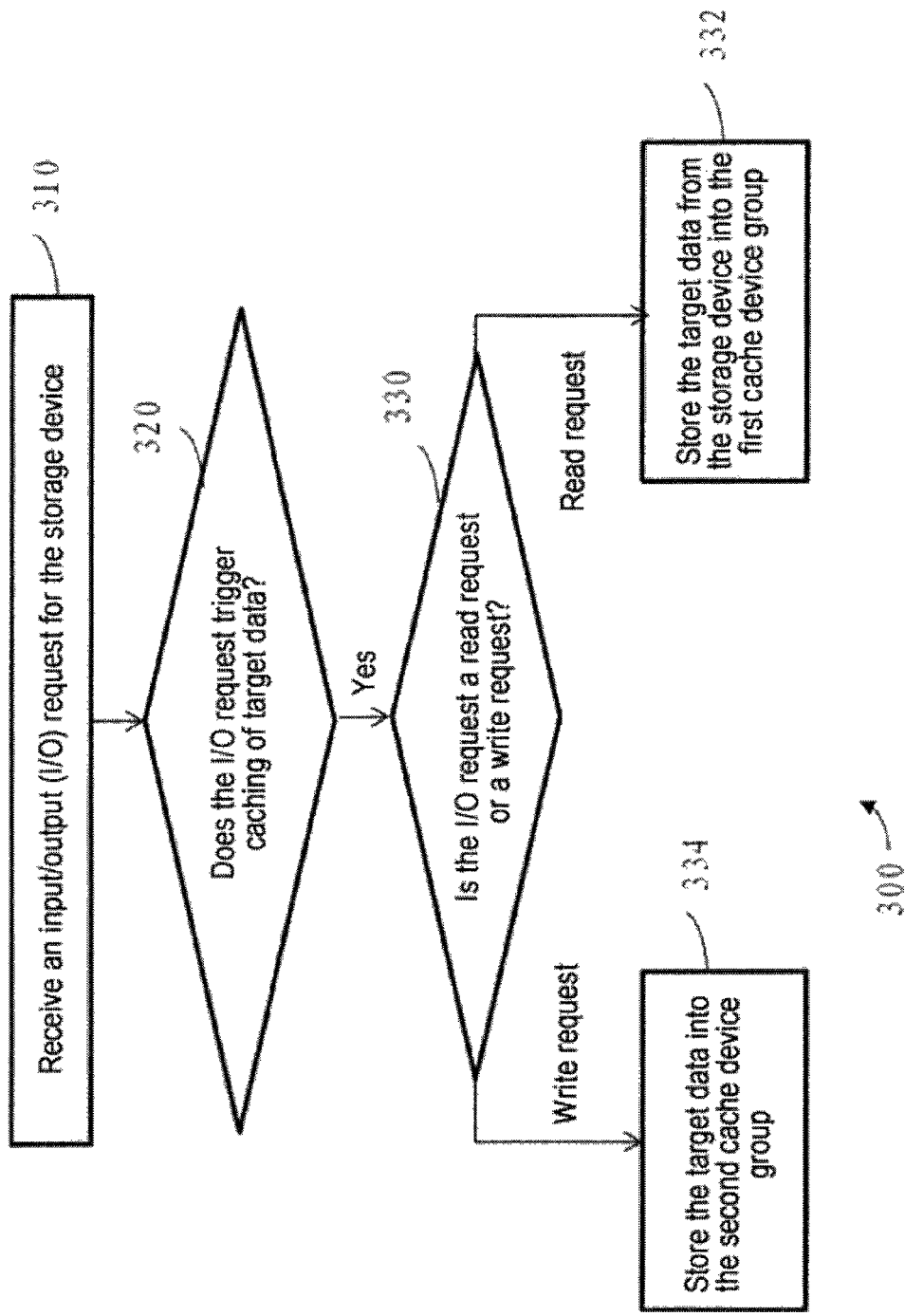
FIGS. 3a-3b illustrate a flow chart of a method for managing a storage system according to an embodiment of the present disclosure.
Figure 3B:
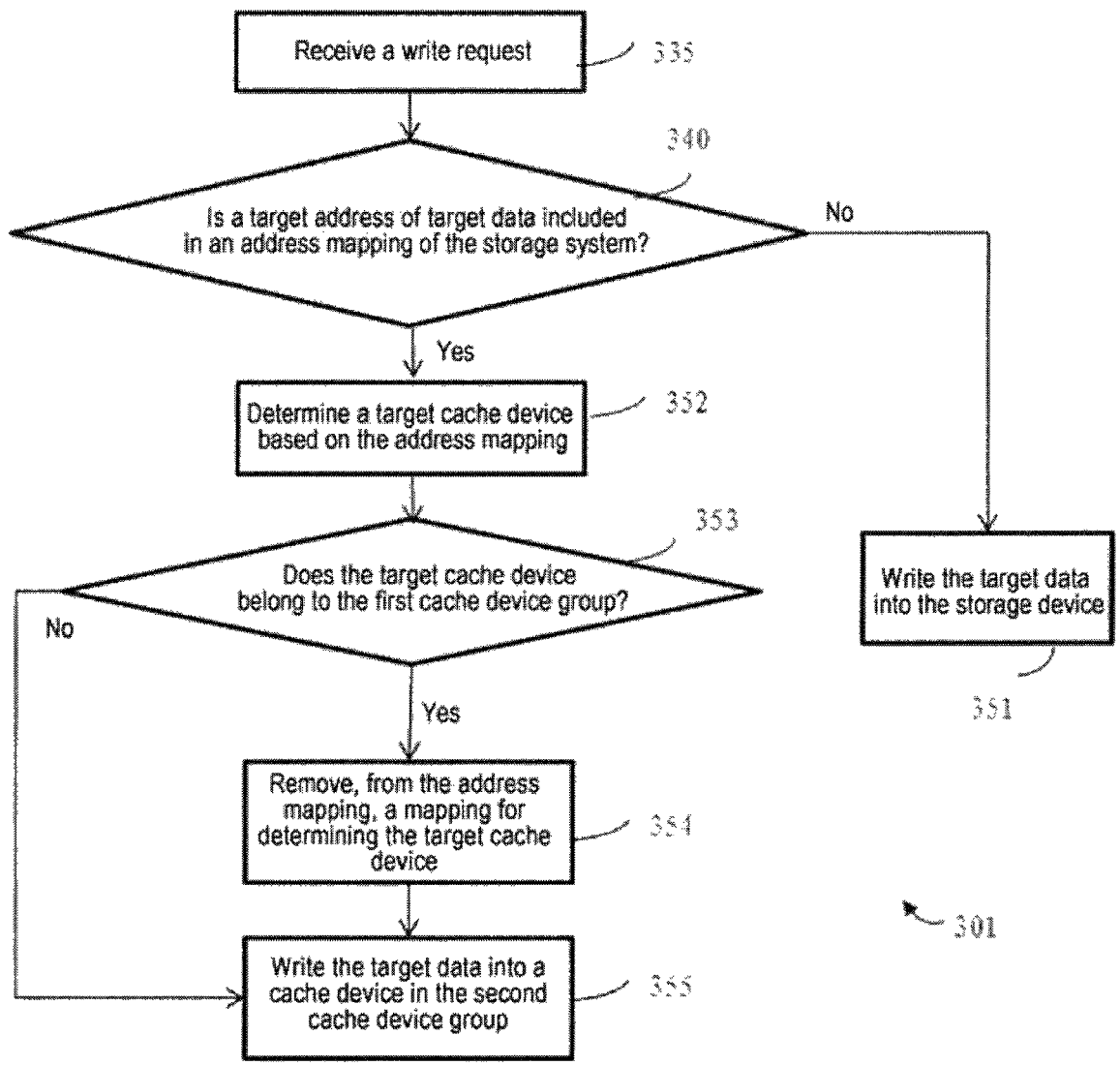

Based on the proposed new architecture, the present disclosure further provides a method and apparatus for managing a storage system to improve the performance of the storage system. Reference is made to FIGS. 3a-3b which illustrate an example flow chart of a method for managing a storage system according to an embodiment of the present disclosure. The method is described by still referring to the storage system 100 shown in FIG. 1. As stated above, the target storage system comprises a plurality of cache devices 111-141 and 112-142 and the bottom storage device 103. This method may be implemented under control of the storage system manager 104 in FIG. 1.

As shown in FIG. 3a, at block 310, an I/O request for the storage device is received. It may be appreciated that the I/O request relates to data to be written or read, called "target data". At block 320, whether the I/O request triggers caching of the target data is determined. If the I/O request does not trigger the request for caching operation, it is only needed to process the request in a conventional manner, which will not be described in detail any more here.

In another aspect, if it is determined at the block 320 that the received current I/O operation will trigger the caching operation, the method 300 will proceed to block 330, wherein it is determined as to whether the received I/O request is a read request or a write request. If it is determined at the block 330 that the received I/O request is the read request, the method 300 proceeds to block 332, wherein the target data are stored from the storage device 103 into the first cache device group 101. In another aspect, if it is determined at block 330 that the I/O request is the write request, the method 300 proceeds to block 334, wherein the target data are stored into the second cache device group 102.

It can be seen that according to the embodiment of the present disclosure, the first cache device group 101 and the second cache device group 102 in the storage device serve the read request and the write request respectively. That is, a data block triggered by the write request is only promoted to the second cache device group 102. In this way, when a cache device in the first cache device group 101 is to be removed, there is no data to be flushed. As such, when cache device in the first cache device group 101 needs to be reduced, it can be removed directly without performing the flushing operation which is time consuming. In the present disclosure, the flushing refers to duplicating data in a cache device to a bottom storage device, and optionally deleting data from the cache device.

Especially, in an embodiment, a cache device in the first cache device group 101 may comprise one or more SSD pairs, and each SSD in the SSD pair may serve a read request independently. As such, the storage capacity in the first cache device group 101 can be totally used to serve the read request, thereby improving the utilization rate of capacity of the SSD pair therein.

Alternatively or additionally, in an embodiment, a cache device in the second cache device group 102 may comprise one or more SSD pairs. One SSD in the SSD pair is used to store a duplicate of data included in the other SSD in the SSD pair, to provide redundant data protection. As appreciated by those skilled in the art, embodiments of the present disclosure are not limited to using "1+1" redundant protection in the second cache device group. For example, in some embodiments, a duplicate of data in one SSD may be stored in more than one SSD.

FIG. 3b illustrates a flow chart of a method 301 for processing a write request according to an embodiment of the present disclosure. The method 301 may be considered as an example implementation of the method 300 shown in FIG. 3a. It will be appreciated from the following depictions that by using the method 301, processing of the write request can be adapted to a change in grouping of the plurality of cache devices in the fast cache.

As shown in FIG. 3b, in this example, in response to receiving a write request at block 335, at block 340, determination is performed as to whether a target address of the target data is included in an address mapping of the storage system 100, wherein the address mapping indicates a mapping between a storage address of the storage device 103 and a caching address of a plurality of cache devices 111-141 and 112-142. Based on the determination at block 340, the target data may be correspondingly written into the storage device 103 or the second cache device group 102. This procedure is shown by blocks 352-355.

In an embodiment, if it is determined at block 340 that the target address is not included in the address mapping, the method 301 proceeds to block 351, where the target data is written into the storage device 103.

In another aspect, if it is determined at block 340 that the target address is included in the address mapping, the method 301 proceeds to block 352, wherein a target cache device is determined based on the address mapping, and the target cache device includes a caching address in the address mapping that corresponds to the target address. Then, at block 353, it is determined that the target cache device belongs to the first cache device group, and at block 354, a mapping for determining the target cache device is removed from the address mapping. At block 355, the target data is written into the cache device in the second cache device group 102.

In another aspect, if it is determined at step 353 that the target cache device belongs to the second cache device group 102, the method 301 proceeds to block 355, where the target data is written into the target cache device in the second cache device group 102.

Figure 4A:
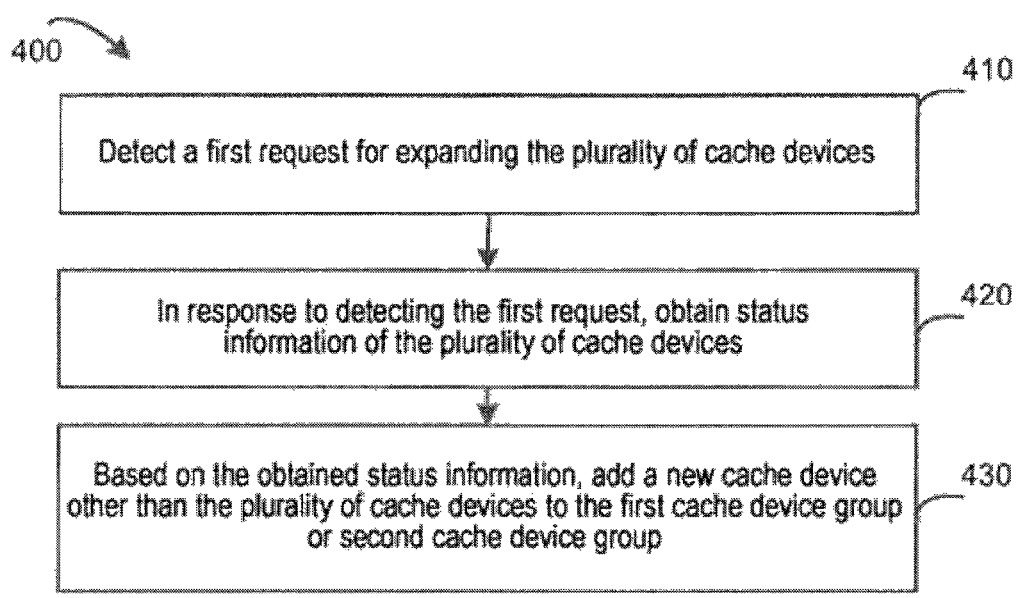
FIGS. 4a-4b illustrate a flow chart of a method for managing a plurality of cache devices according to an embodiment of the present disclosure.
Figure 4B:
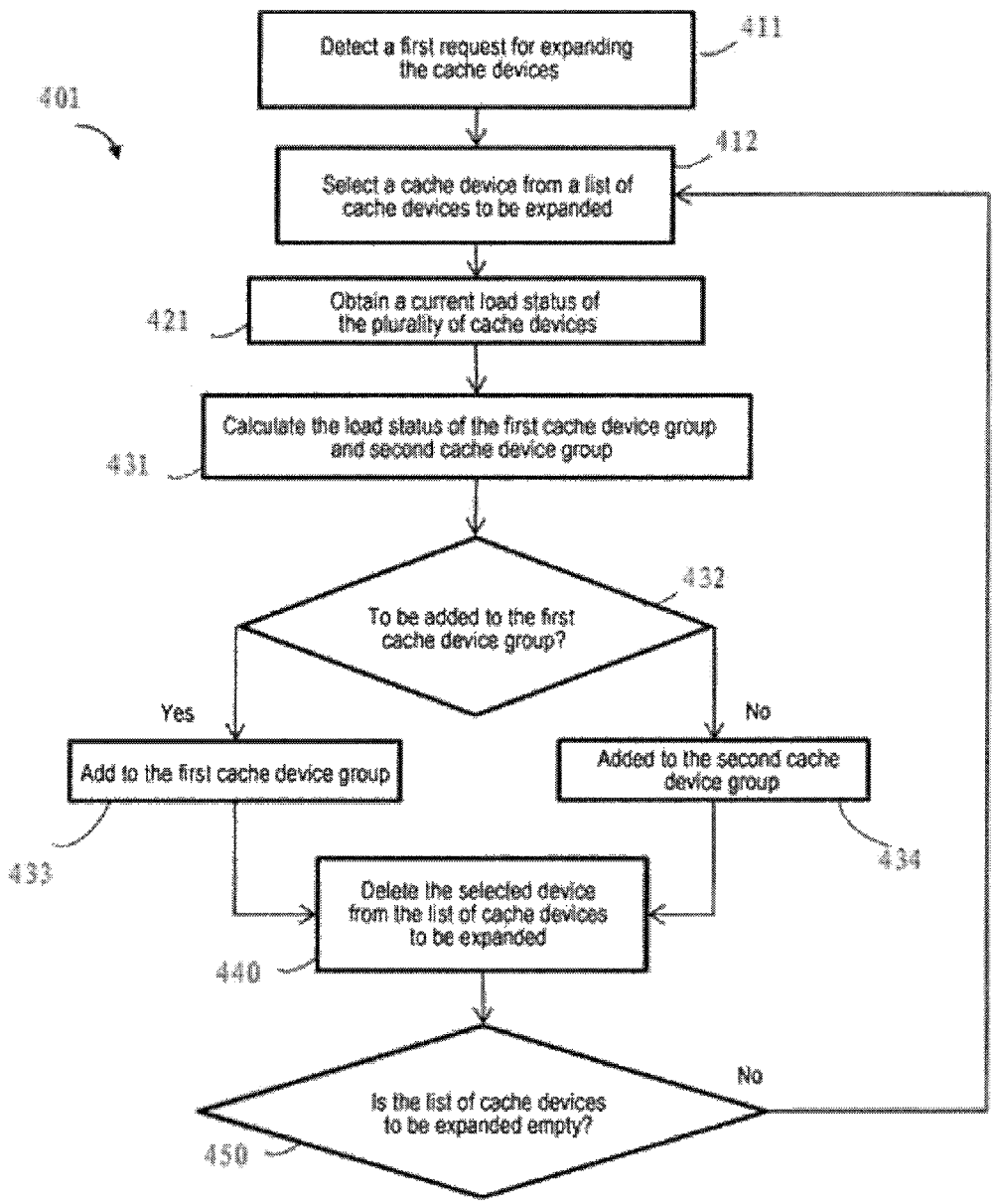

Reference is made below to FIGS. 4a-4b which illustrate a method 400 and a method 401 for managing a plurality of cache devices according to another aspect of the present disclosure. The methods 400 and 401 enable to expand the cache devices in the storage system adaptively. The methods 400 and 401 will be described with reference to the storage system 100 shown in FIG. 1. As stated above, the first cache device group 101 and second cache device group 102 may serve the read request and write request respectively. For example, a cache device in the first cache device group 101 may comprise one or more SSD pairs (see 213, 214 in FIG. 2), and each SSD in the SSD pair serves the read request independently. A cache device in the second cache device group 102 includes one or more SSD pairs (e.g., 211, 212 in FIG. 2), and one SSD in the SSD pair is used to store a duplicate of data included in the other SSD in the SSD pair, to provide redundant data protection. In an embodiment, the method 400 may be performed under control for example, from the storage system manager 104 in FIG. 1.

As shown in FIG. 4a, at block 410, an expansion trigger request (called "a first request") for expanding a plurality of cache devices is detected. In an embodiment, the first request is a request input from the user. Especially, in an embodiment, the first request may include a list of a plurality of candidate cache devices designated by the user. In this case, a new cache device to be added may be determined from the first request.

At block 420, status information of the plurality of cache devices is obtained in response to detecting the first request. In some embodiments, at block 420, a load status of the cache devices may be obtained. Alternatively or additionally, in some embodiments, at block 420, usage situation of storage space of a cache device may be obtained. Any other status information is also possible, and the scope of the present disclosure is not limited in this aspect.

At block 430, based on the status information obtained at block 420, a new cache device is added to the first cache device group 101 or second cache device group 102. In this way, a newly-added cache device can be used for serving a write request or a read request depending on needs. This enables to expand the fast cache automatically and adaptively. A specific example of this aspect will be described below with reference to FIG. 4b.

FIG. 4b shows a flow chart of an embodiment of another example method 401. The method 401 may be considered as an example implementation of the method 400. In an example shown in FIG. 4B, expansion request from the user includes a list of cache devices to be added. The devices included in the list are added to the storage system 100 iteratively.

Specifically, as shown in FIG. 4b, at block 411, a first request for expanding the fast cache is detected. The operation corresponds to the block 410 of the method 400. Then, at block 412, new cache devices (e.g., SSD pairs) are selected one by one from the list of the plurality of candidate cache devices, for adding to the first cache device or second cache device.

Then, at block 421, the status information of the plurality of cache devices is obtained. The block 421 corresponds to block 420 in the method 400. As stated above, the status information for example may include current load status and/or storage space usage status of a cache device.

The blocks 431-434 in the method 401 correspond to the block 430 in the method 400, and are used to add a new cache device other than the plurality of cache devices to the first cache device group or second cache device group based on the status information obtained at block 421. Specifically, at block 431, load status of the first cache device group 101 (e.g., RO group) and second cache device group 102 (e.g., RW group) is calculated based on the status information of the plurality of cache devices obtained at block 421.

At block 432, based on a result calculated at block 431, a type to which the selected cache device is to be expanded is determined, namely, whether expanding the selected cache device to the first cache device group 101 (e.g., RO group) or second cache device group 102 (e.g., RW group). In an embodiment, the status information may comprise load status of the cache devices. In this case, the load status of the first cache device group 101 and the second cache device group 102 may be compared. If a difference between the first load of the first cache device group 101 and the second load of the second cache device group 102 exceeds a predetermined threshold, or a ratio of the first load to the second load exceeds a predetermined threshold, it is determined that new cache device is to be added to the first cache device group 101. On the contrary, if the difference between the first load and the second load or the ratio of the first load to the second load is below the predetermined threshold, it is determined that new cache device is to be added to the second cache device group. As an example, the predetermined threshold may be set to be 0 or a number greater than 0. However, embodiments of the present disclosure are not limited to any specific number. The predetermined threshold may be properly adjusted according to needs.

Alternatively or additionally, as stated above, the status information obtained at block 421 may further comprise storage space usage situation of a cache device. In this case, at block 431, usage rate of the storage space of the second cache device group may be determined based on the usage situation of the storage spaces of the plurality of cache devices. At block 432, if usage rate of the storage space of the second cache device group exceeds a first threshold, it is determined that the new cache device is to be added to the second cache device group; if the usage rate of the storage space of the second cache device group is below the first threshold, it is determined that the new cache device is to be added to the first cache device group. Embodiments of the present disclosure are not limited to using any specific numerical value as the first threshold.

In a further embodiment, at block 431, an idle rate of the storage space of the second cache device group may be determined based on the usage situation of the storage space of the plurality of cache devices. In such an embodiment, at block 432, if the idle rate of the storage space of the second cache device group is below a second threshold, it is determined that the new cache device is to be added to the second cache device group; if the idle rate of the storage space of the second cache device group is above the second threshold, it is determined that the new cache device is to be added to the first cache device group. Furthermore, the adding operation is executed according to the determination at block 433 or 434. Similarly, the second threshold is not limited to any specific numerical value and it may be adjusted property according to needs.

Based on a result of the determination at the block 432, the selected cache device is expanded to the first cache device group (block 433) or the second cache device group (block 434). Then, the method 401 may proceed to block 440, where the selected device is deleted from the list of the cache devices to be expanded. Then, at block 450, it is checked whether the list of cache devices to be expanded is empty. If it is not empty, the method 401 returns to block 411 to perform selecting, obtaining, expanding, deleting and checking operations repeatedly until the list of cache devices to be expanded is empty.

Figure 5A:
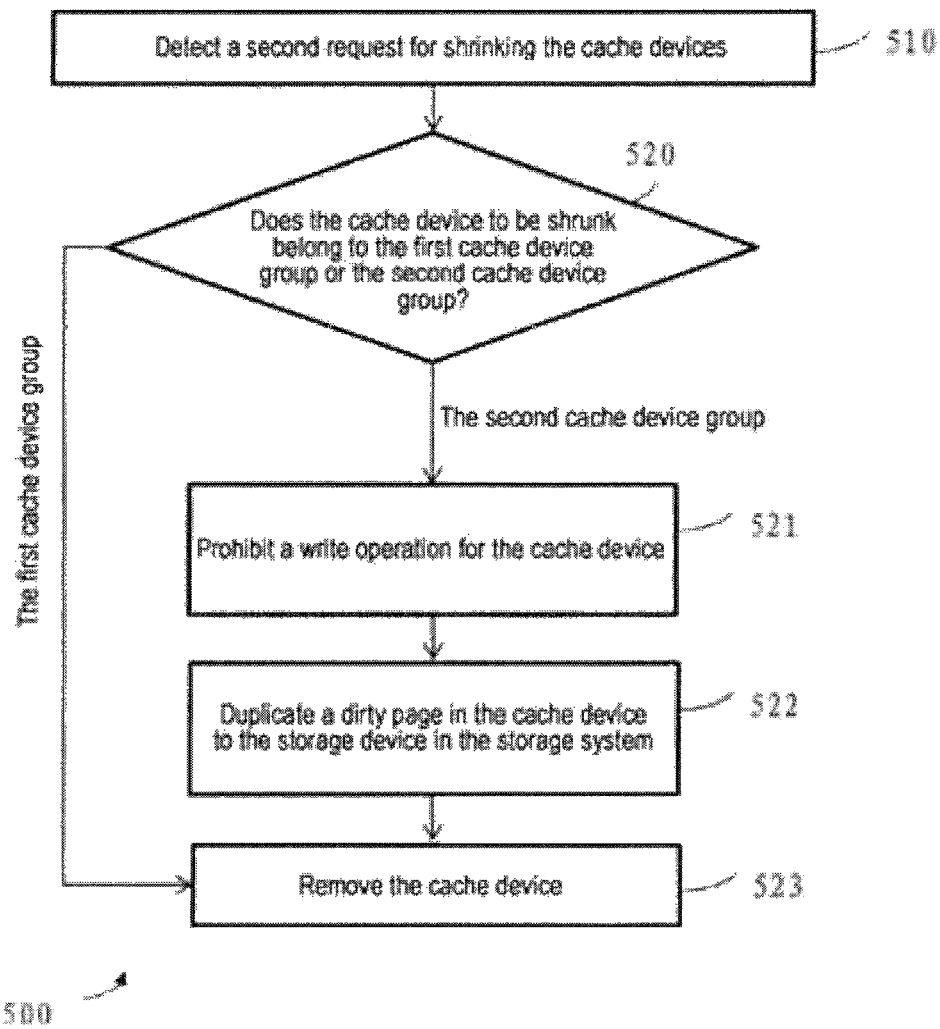
FIGS. 5a-5b illustrate a flow chart of another method for managing a plurality of cache devices according to an embodiment of the present disclosure.
Figure 5B:
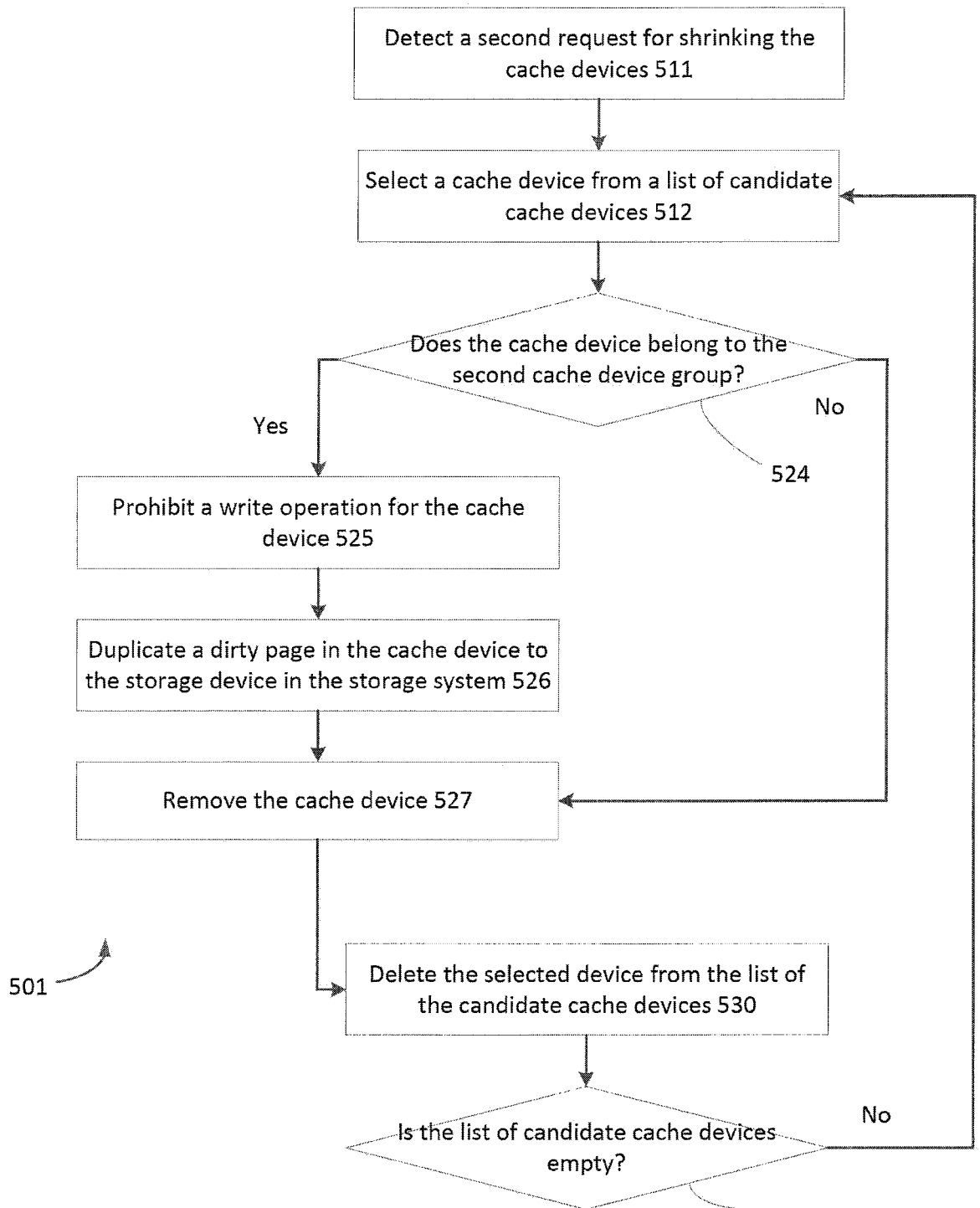

Reference is made below to FIGS. 5a-5b which illustrate a method 500 and a method 501 for managing a plurality of cache devices according to an embodiment of another aspect of the present disclosure. The methods 500 and 501 enable to shrink the plurality of cache devices in the storage system effectively. The methods 500 and 501 are described still with reference to the storage system 100 shown in FIG. 1. As stated above, the plurality of cache devices comprise at least the first cache device group 101 and second cache device group 102, which may serve the read request and the write request respectively. For example, a cache device in the first cache device group 101 may comprise one or more SSD pairs (for example, 213, 214 in FIG. 2), and each SSD in the SSD pair serves the read request independently. A cache device in the second cache device group 102 includes one or more SSD pairs (e.g., 211, 212 in FIG. 2), and one SSD in the SSD pair is used to store a duplicate of data of the other SSD in the second SSD pair, to provide redundant data protection. However, embodiments of the present disclosure are not limited to using the SSD pair to construct the cache device. In an embodiment, the methods 500 and 501 may be implemented, for example, under control of the storage system manager 104 in FIG. 1.

As shown in FIG. 5a, the method 500 for the storage system comprises: at block 510, detecting a shrinking request (called "a second request") for shrinking the cache devices. In an embodiment, the second request is a request input from the user. Especially, in an embodiment, the second request may include a list of a plurality of candidate cache devices designated by the user. In this case, the cache device to be shrunk may be determined from the second request.

At block 520, at least one cache device is removed from the first cache device group 101 or the second cache device group 102 in response to detecting the second request. For example, at block 520, a type of the cache device to be shrunk is determined, namely, whether the cache device to be shrunk is located in the first cache device group 101 or the second cache device group 102. If the cache device to be shrunk belongs to the first cache device group 101, the cache device to be shrunk may be directly removed from the plurality of cache devices through the block 523. If the cache device to be shrunk belongs to the second cache device group 102, at least one cache device in the second cache device group 102 may be removed from the plurality of cache devices through the operations of blocks 521-523. As shown in FIG. 5a, at block 521, a write operation of the at least one cache device is prohibited; at block 522, a dirty page in the at least one cache device is duplicated to the storage device in the storage system; and at block 523, the at least one cache device is removed.

In this manner, different processing may be performed for removal of the cache devices in the first cache device group and the cache devices in the second cache device group, to avoid unnecessary flushing operation of the dirty page, shorten delay and improve the user's experience.

In an example where the second request is an input from the user and includes a plurality of candidate cache devices designated by the user, corresponding shrinking (also called removing) operations in the blocks 520-523 based on the types of the cache devices may be performed for each cache device in the list.

FIG. 5b shows a flow chart of an embodiment of another example method 501. The method 501 may be regarded as an example implementation of the method 500. In the example shown in FIG. 5b, the request for shrink from the user includes a list of cache devices to be shrunk. The devices included in the list are removed from the storage system 100 iteratively.

Specifically, as shown in FIG. 5b, at block 511, a second request for shrinking cache devices is detected. The operation corresponds to the block 510 of the method 500. Then, at block 512, a cache device is selected from the list of candidate cache devices for removing from the storage system 100. At blocks 524-527, a removal operation is performed for the device based on the cache device group to which the cache device belongs (namely, the type of cache device). Specifically, at block 524, it is determined whether the cache device belongs to the second cache device group 102 (e.g., RW group). The operation corresponds to the block 520 in FIG. 5a. If the cache device does not belong to the second cache device group 102, the selected cache device is directly removed from the plurality of cache devices through the block 527; on the contrary, if the cache device belongs to the second cache device group 102, operations of blocks 525-527 are performed. The operation corresponds to the block 521-523 in FIG. 5a.

Based on a result of the determination at block 524, the selected cache device is removed from the first cache device group (block 527) directly, or removed from the second cache device group through blocks 525-527. Then, furthermore, the selected device may be deleted from the list of the candidate cache devices at block 530, and at block 540, it is checked as to whether the list of the candidate cache devices is empty. If the list is not empty, the method 501 returns to block 512 to continue to perform selecting, removing, deleting and checking operations until the list of the candidate cache devices is empty.

In another embodiment, there may not be the list of candidate cache devices input by the user. In this case, in the method 500 in FIG. 5a, the storage device to be shrunk may be selected based on at least one of load, online time, storage space occupation and the like of cache devices in the fast cache.

In a further embodiment, the second request received at block 510 of the method 500, may specify the number of cache devices to be shrunk. In this case, in the method 500, the specified number of cache devices may be selected based on at least one of load, online time, storage space occupation and the like for shrinking. This embodiment enables minimizing the influence of the system performance while shrinking the storage devices.

Figure 6A:
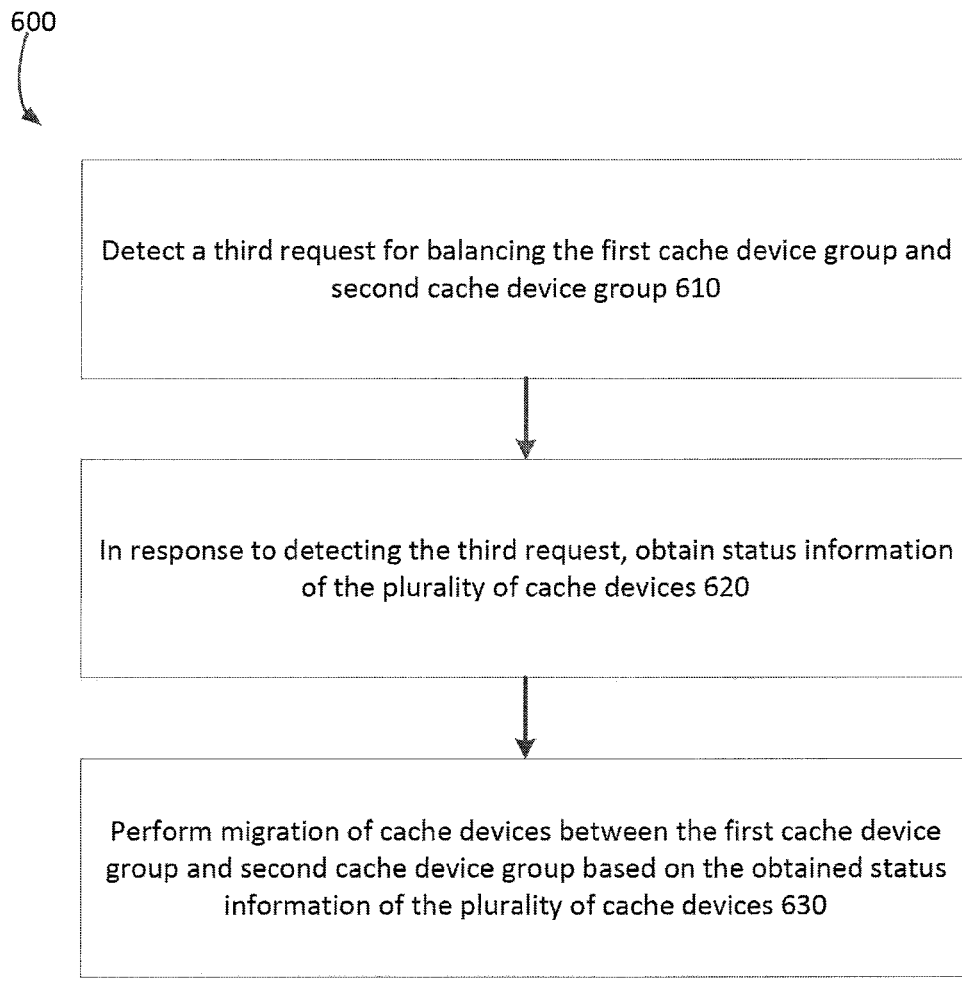
FIGS. 6a-6b illustrate a flow chart of a further method for managing a plurality of cache devices according to an embodiment of the present disclosure.
Figure 6B:
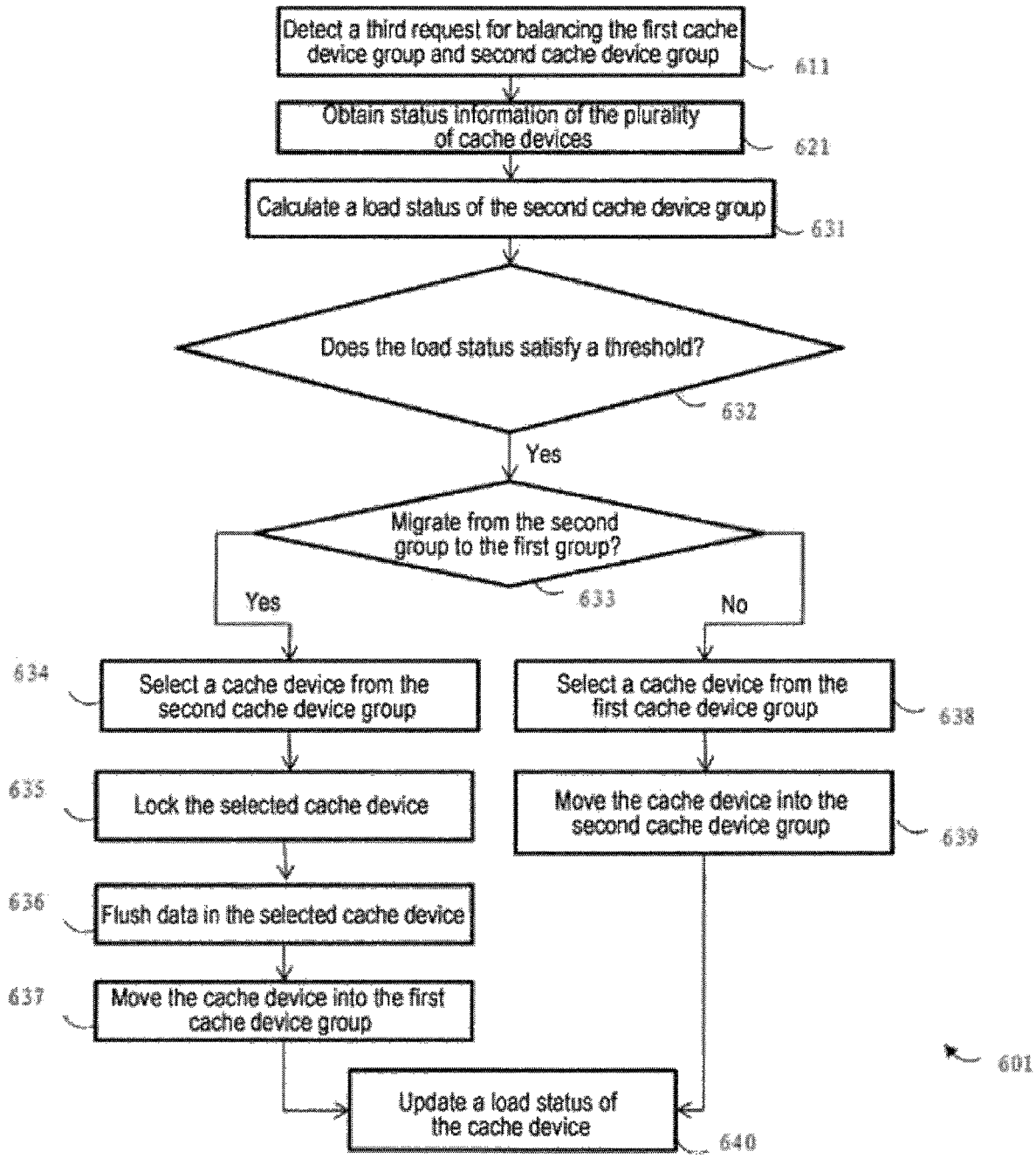

Reference is made to FIGS. 6a-6b which illustrate methods 600 and 601 for managing a plurality of cache devices according to an embodiment of another aspect of the present disclosure. The methods 600 and 601 allow for performing effective balance and optimization for the plurality of cache devices in the storage system. The methods 600 and 601 are described still with reference to the storage system 100 shown in FIG. 1. As stated above, the plurality of cache devices comprise the first cache device group 101 and second cache device group 102, which may respectively serve the read request and write request. For example, a cache device in the first cache device group 101 may comprise one or more SSD pairs (for example, 213, 214 in FIG. 2), and each SSD in the SSD pair independently serves the read request. A cache device in the second cache device group 102 includes one or more SSD pairs (e.g., 211, 212 in FIG. 2), and one SSD in the SSD pair is used to store a duplicate of data of the other SSD in the second SSD pair, to provide redundant data protection. However, embodiments of the present disclosure are not limited to using the SSD pair to construct the cache device. In an embodiment, the methods 600 and 601 may be implemented, for example, under control of the storage system manager 104 in FIG. 1.

As shown in FIG. 6a, at block 610, a balance trigger request (called "a third request") for balancing the first cache device group and second cache device group is detected. At block 620, status information of the plurality of cache devices is obtained in response to detecting the third request. In some embodiments, the status information of the cache devices obtained at the block 420 may indicate at least one of: load status, online time and storage space occupation of the plurality of cache devices. Any other status information is also possible, and the scope of the present disclosure is not limited in this aspect.

At block 630, migration of a cache device is performed between the first cache device group and the second cache device group based on the obtained status information of the plurality of cache devices. In this way, it is enabled to adjust grouping of the plurality of cache devices according to one or more of load, online time and storage space occupation of cache devices of fast cache, to obtain balance of load and usage of storage space, so that the plurality of cache devices can be used more effectively.

In an embodiment, the method 600 enables running and processing of a back end to provide a better caching efficiency (e.g., fast caching efficiency) based on the system status. This can be implemented by monitoring a status (e.g., input/output per second (IOPS), bandwidth, online time, and usage rate) of a cache disk, and based on the status, automatically balancing magnetic disks between two cache device groups (e.g., a RW group and a RO group) in the plurality of cache devices for fast caching.

In a specific embodiment, a load status of the plurality of cache devices may be obtained at block 620, and at block 630, based on the load status of the plurality of cache devices, a first load of the first cache device group and a second load of the second cache device group may be determined; if a difference between the first load and the second load or a ratio of the first load to the second load exceeds a predetermined threshold, a first cache device in the second cache device group is migrated to the first cache device group; if the difference between the first load and the second load or the ratio of the first load to the second load is below the predetermined threshold, a second cache device in the first cache device group is migrated to the second cache device group.

In another embodiment, a usage situation of the storage space of the plurality of cache devices may be obtained at block 620, and at block 630, based on the usage situation of the storage space of the plurality of cache devices, a usage rate of storage space of the second cache device group is obtained; if the usage rate of the storage space of the second cache device group exceeds a third threshold, a second cache device in the first cache device group is migrated to the second cache device group; if the usage rate of the storage space of the second cache device group is below the third threshold, a first cache device in the second cache device group is migrated to the first cache device group.

As a further specific example, a usage situation of the storage space of the plurality of cache devices may be obtained at block 620, and at block 630, based on the usage situation of the storage space of the plurality of cache devices, an idle rate of the storage space of the second cache device group is obtained; if the idle rate of the storage space of the second cache device group is below a fourth threshold, a second cache device in the first cache device group is migrated to the second cache device group; if the idle rate of the storage space of the second cache device group is above the fourth threshold, a first cache device in the second cache device group is migrated to the first cache device group.

In an embodiment, the load status of the first cache device group may comprise: total load status, average load status, or minimum/maximum load status of cache devices in the first cache device group. In another embodiment, the load status of the cache devices in the first or second cache device group may comprise: instant load status, average or minimum or maximum load status of the cache devices in a period of time.

In another embodiment, at block 630, it may be determined as to whether migration of a cache device should be performed and a migration direction (namely, from the first cache device group to the second cache device group, or on the contrary) by comparing algorithmic average values of IOPS of the two cache device groups. If migration happens, the type and attribute of the migrated cache device may be changed accordingly. For example, the attribute of the cache device may be changed from the RW type to RO type, or change on the contrary).

In a further embodiment, at block 630, an average load of the RO cache device group and RW cache device group may be calculated respectively according to the following equations (1) and (2):

$$Load_{avg_r} = \frac{\sum_{i=0}^{m} Load_r}{m} \quad (1)$$

$$Load_{avg_w} = \frac{\sum_{i=0}^{n} Load_w}{n}, \quad (2)$$

Then, at block 630, a load balancing factor α of the RO device group and RW device group may be calculated according to equation (3) or (4):

$$\alpha = Load_{avg\_r} - Load_{avg_w} \quad (3)$$

$$\alpha = Load_{avg\_r} / Load_{avg_w} \quad (4)$$

The α and threshold T may be compared to determine whether to migrate and determine the migration direction. For example, when equation (3) is used for calculation, if an absolute value of α is smaller than T, it implies that load difference of the two cache device groups is not large, and migration of a cache device is not needed. In this case, a migration flag may be set as Flag=0. If α>T, it may be determined that the load of the RO device group is excessively high relative to that of the RW device, and then the migration flag may be set as Flag=RW->RO. If −α>T, it may be determined that the load of the RW device group relative to the RO device group is excessively high, and then for example the migration flag may be set as Flag=RO->RW. In another example, the equation (4) is used to calculate the load balancing factor, and if α>T, it may be determined that the load of the RO device group is excessively high, whereupon the migration flag may be set as Flag=RW->RO. If 1/α>T, it may be determined that the load of the RW device group is excessively high, whereupon for example the migration flag may be set as Flag=RO->RW. In other cases, the migration flag may be set as Flag=0, i.e., migration is not needed.

Alternatively or additionally, in another embodiment, at block 630, it may be determined as to whether to perform migration and determine the migration direction according to comparison of idle capacities of cache devices in respective groups. For example, if the idle capacity of the second cache device group is smaller than a thresholdβ, it is determined that a cache device is to be migrated from the first cache device group to the second cache device group, and the migration flag may be set, for example, as Flag=RO->RW.

FIG. 6b shows a flow chart of performing balance operation for the cache devices using another example method 601. The method 601 may be regarded as an example implementation of the method 600. Specifically, operations of blocks 611 and 621 are respectively the same as the operations of blocks 610 and 620 in the preceding method 600, and the operations in block 630 in method 600 may be implemented through blocks 631-639 in the example of FIG. 6b.

As shown in FIG. 6b, at block 631, a load status of the second cache device group 102 (e.g., RW group) is calculated, and the load status for example may be a relative load relative to the load of the first group of cache devices. At block 632, the load status is compared with a threshold to determine whether to perform migration operation. If migration is needed, the migration direction is determined at block 633. If it is determined that migration from the second cache device group (e.g., RW group) to the first cache device group 101 (e.g., RO group) is to be performed, operations of blocks 634-637 are performed. At block 634, one or more cache devices in the second cache device group are selected; at block 635, the selected cache devices are locked; at block 636, data in the selected cache devices are flushed; and block 637, the cache device is moved into the first cache device group. If it is determined at block 633 that migration in the contrary direction is to be performed, operations of blocks 636-639 are performed, i.e., at block 638, one or more cache devices are selected from the first cache device group; and at block 639 the selected cache device is moved into the second cache device group. Optionally, as shown in FIG. 6b, upon completion of migration, load status of the (disk) of the cache device may be updated at block 640, for example, a corresponding status data table may be updated.

In an embodiment, in block 634 and/or block 638, a cache device to be migrated may be selected based on at least one of obtained load status, online time and usage situation of the storage space of the plurality of cache devices. For example, a cache device with the shortest online time and/or minimum load may be selected for migration, so that the cache device can be used more sufficiently.

In another embodiment, the third request detected in the block 610 of the method 600 and block 611 of the method 601 may be at least one of the following: a periodical scheduling request, a request input by a user, or a threshold-based trigger request. The periodical scheduling request may also be called a scheduling trigger, and it may be based on a system-level parameter, e.g., scheduling period. The period may be set long, e.g., several hours or several days, to reduce the system workload of the back end. The request input by the user may also be called an operation trigger, and it is based on the user's operation, e.g., an operation input by the user for expanding or shrinking or load balance. The threshold-based trigger request may also be called a threshold trigger, and it may also be based on a system-level parameter such as a triggering threshold. When the load and/or capacity usage and/or unbalance between the two groups reach a preset threshold, the balance operation is triggered.

Figure 7:
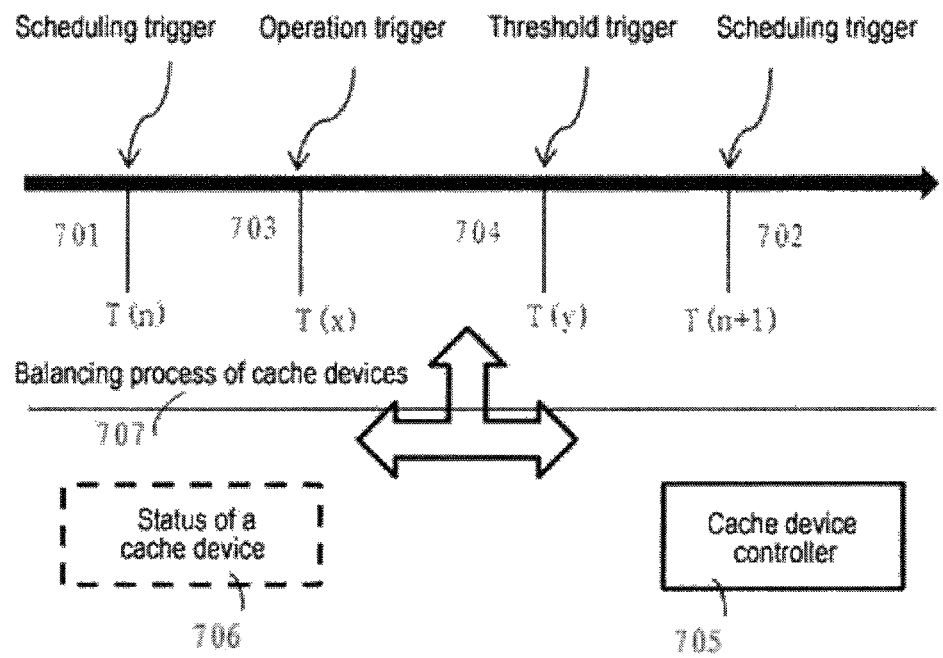
FIG. 7 illustrates an example of a trigger request for triggering balance operation between a plurality of cache devices according to an embodiment of the present disclosure.

FIG. 7 shows examples of the three types of triggers/requests. As shown in FIG. 7, between the $n^{th}$ scheduling trigger 701 and the $n+1^{th}$ periodical scheduling trigger 702, there might exit one or more operation trigger 703 T(x) input by the user or threshold-based trigger 704 T(y). In response to the trigger/request, a cache device controller 705 may execute a cache device balance process 707 between the first cache device group 101 and the second cache device group 102 in FIG. 1 based on a cache device status 706 according to a method of the embodiment of the present disclosure, for example method 600 or 601. The cache device controller 705 may be the storage system manager 104 in FIG. 1 or a part thereof.

In another embodiment, an attribute table may be maintained for each cache device in the plurality of cache devices. Correspondingly, at the block 630 of the method 600 or blocks 637 and 639 of method 601, it is feasible to migrate a cache device to another cache device group by changing an attribute value of device type of the cache device.

Figure 8:
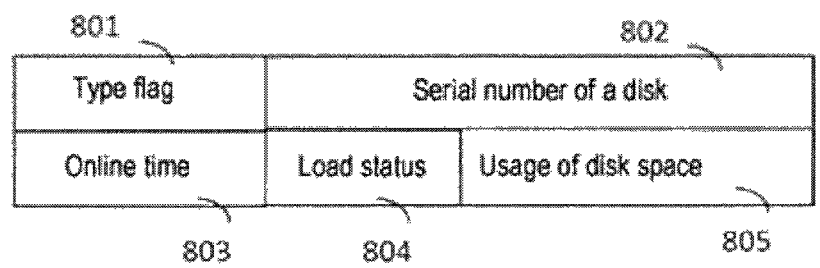
FIG. 8 illustrates an example of a data structure for maintaining a relevant attribute of storage device according to an embodiment of the present disclosure.

Exemplarily but not restrictively, a data structure shown in FIG. 8 may be employed to maintain a relevant attribute of the storage device, wherein a type flag 801 is used to describe the type of the cache device (e.g., disk pair). The flag for example may have the following three statuses: "RW", "RO" and "Locked". "RW" indicates that the cache device is used as RAID1, and it can write data from the front end, and promote IO data from the bottom storage device (e.g., physical disk) to the cache device. "RO" indicates that the cache device (e.g., disk) is used as RAID 0 and it can promote IO data from the bottom storage device (e.g., physical disk) to the cache device, but cannot write data from the front end. "Locked" indicates that the disk cannot write data from the front end or promote IO data from the physical disk to the cache device, and the front end can only retrieve data currently stored on the cache device.

A disk serial number 802 in FIG. 8 records information on serial number of the cache device, and it may include for example serial numbers of two disks in the SSD pair, for example, S0T1N6ACA11853 and S0T1N6ACA10221. Both of the two disks may be, for example, SAMSUNG SATA flash disk with a capacity of 200GB. An online time attribute 803 in FIG. 8 records online time of the cache device for use as the RW type or RO type. The load status attribute 804 may indicate the load situation based on for example IOPS and bandwidth. The disk space usage attribute 805 describes usage situation of the disk space. For example, those skilled in the art can understand embodiments of the present disclosure are not limited to the attribute shown in FIG. 8. For example, in another embodiment, more or less or different attribute items with a different data structure may be maintained.

A structure of an apparatus 900 for managing the storage system is described below with reference to FIG. 9. The storage system for example may be the storage system 100 shown in FIG. 1. The storage system comprises a plurality of cache devices (111-141 and 112-142) and a bottom storage device (103), wherein the plurality of storage devices may comprise the first cache device group 101 and second cache device group 102. The first and second cache device groups for example may be an RO group and an RW group respectively. The apparatus 900 may execute the methods 300 and 301 described with reference to FIGS. 3a-3b, but is not limited to executing the methods 300 and 301. Likewise, the methods 300 and 301 may be executed by the apparatus 900, but are not limited to being executed by the apparatus 900. For example, at least some operations of the method 300 or 301 may be executed by other apparatuses.

Figure 9:
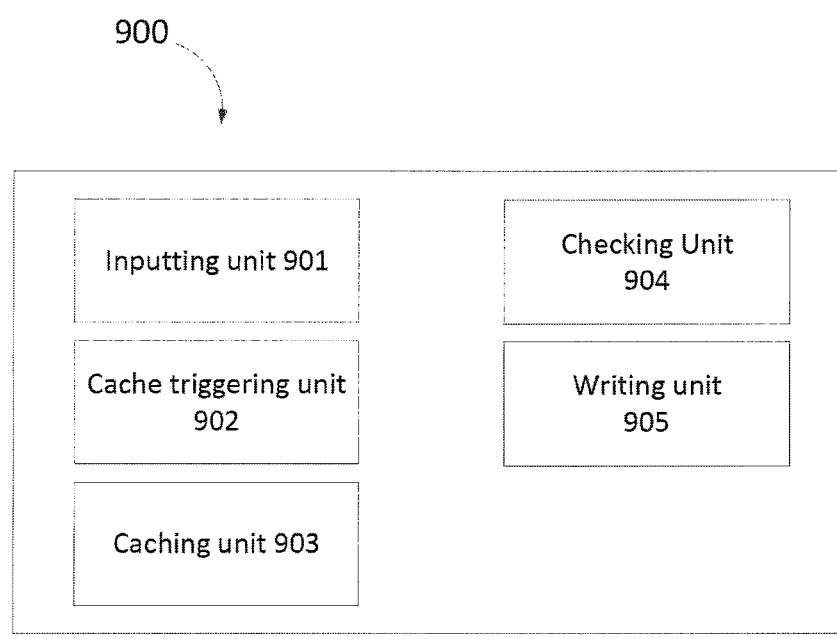
FIG. 9 illustrates a schematic structural diagram of an apparatus for managing a storage system according to an embodiment of the present disclosure.

As shown in FIG. 9, the apparatus 900 comprises an inputting unit 901 configured to receive an I/O request for the storage device; a cache triggering unit 902 configured to determine whether the received I/O request triggers caching of target data; and a caching unit 903. If the I/O request is determined by the cache triggering unit 902 as triggering the caching of the target data, the caching unit 903 is configured to store the target data from the storage device 103 into the first cache device group 101 in the case that the I/O request is a read request; the caching unit 903 is configured to store the target data into the second cache device group 102 in the case that the I/O request is a write request.

Depictions with respect to the first cache device group 101 and second cache device group 102 provided in conjunction with the methods 300 and 301 also apply here and are not repeated here for simplicity.

In another embodiment, the apparatus 900 may further comprise: a checking unit 904 and a writing unit 905. The checking unit 904 is configured to, in response to the I/O request being a write request; further determine whether a target address of the target data is included in an address mapping of the storage system. The address mapping indicates a mapping between a storage address of the storage device and a cache address of the plurality of cache devices. The writing unit 905 is configured to execute the write operation based on a result of the check. For example, the write operation may be performed according to the flow in blocks 351-355 in FIG. 3b.

In an embodiment, the apparatus 900 may be the storage system manager 104 in FIG. 1 or a part thereof.

Figure 10:
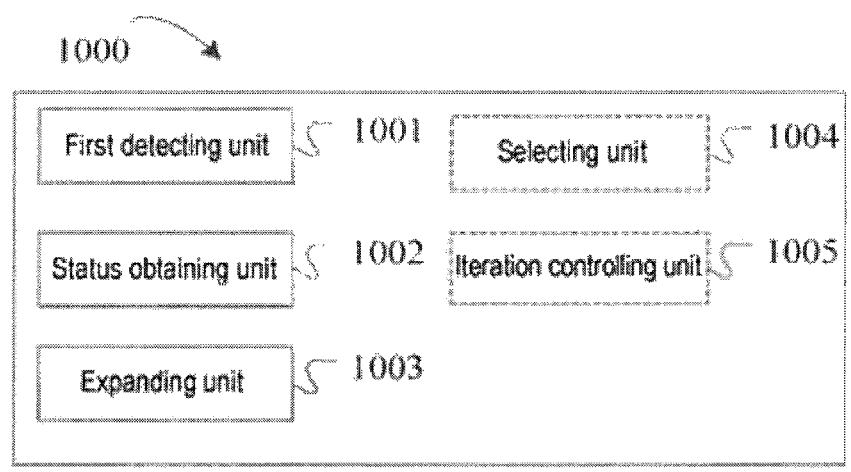
FIG. 10 illustrates a schematic structural diagram of an apparatus for managing a plurality of cache devices according to an embodiment of the present disclosure.

FIG. 10 illustrates a schematic structural diagram of an apparatus 1000 for managing a plurality of cache devices according to an embodiment of the present disclosure. The plurality of cache devices may comprise the first cache device group 101 serving the read request and the second cache device group 102 serving the write request in FIG. 1. In an embodiment, the plurality of cache devices may constitute a fast cache or a part thereof. The first cache device group and the second cache device group may be, for example, the RO group and RW group respectively.

The apparatus 1000 may execute the methods 400 and 401 described with reference to FIGS. 4a-4b, but is not limited to executing the methods. Likewise, the methods 400 and 401 may be executed by the apparatus 1000, but are not limited to being executed by the apparatus 1000. For example, at least some operations of the method 400 or 401 may be executed by other apparatuses. In an embodiment, the apparatus 100 may be the storage system manager 104 in FIG. 1 or a part thereof.

As shown in FIG. 10, the apparatus 1000 may comprise: a first detecting unit 1001 configured to detect a first request for expanding the plurality of cache devices; and a status obtaining unit 1002 configured to, in response to detecting the first request, obtain status information of the plurality of cache devices, the status information indicating at least one of the load status and usage situation of the storage space; and an expanding unit 1003 configured to add a new cache device other than the plurality of cache devices to the first cache device group or the second cache device group based on the obtained status information. In an embodiment, the apparatus may execute the methods 400 and 401 described with reference to FIGS. 4a-4b, therefore, the expanding and obtaining operations described with reference to methods 400 and 401 also apply to the status obtaining unit 1002 and expanding unit 1003, and are not detailed here.

Optionally, in another embodiment, the apparatus 1000 may further comprise a selecting unit 1004 and an iterative controlling unit 1005. The controlling unit 1004 may be configured to select, from a list of candidate cache devices, a cache device for expansion. The iterative controlling unit 1005 may be configured to cause to execute the obtaining and expanding operations for each cache device in the list of the candidate cache devices iteratively. For example, the iterative controlling unit 1005 may be configured to update the list of the candidate cache devices by deleting the selected device from the list of the candidate cache devices, and check whether the list of the candidate cache devices is empty, and if the list is not empty, cause the selecting unit 1004, status obtaining unit 1002 and expanding unit 1003 to execute operations.

Figure 11:
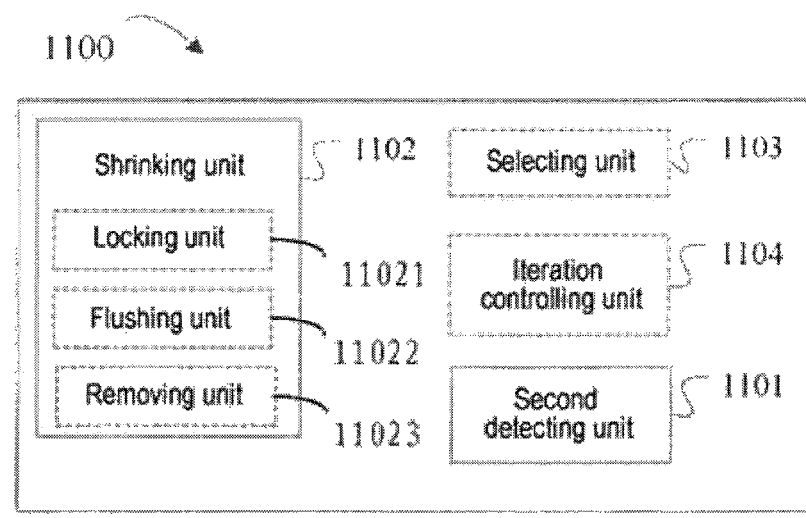
FIG. 11 illustrates a schematic structural diagram of another apparatus for managing a plurality of cache devices according to an embodiment of the present disclosure.

FIG. 11 illustrates a schematic structural diagram of another apparatus 1100 for managing a plurality of cache devices according to an embodiment of the present disclosure. The plurality of cache devices comprise, for example, the first cache device group 101 serving the read request and the second cache device group 102 serving the write request in FIG. 1.

The apparatus 1100 may perform the methods 500 and 501 described with reference to FIGS. 5a-5b, but is not limited to executing the methods. Likewise, the methods 500 and 501 may be executed by the apparatus 1100, but are not limited to being executed by the apparatus 1100. For example, at least some operations of the method 500 or 501 may be executed by other apparatuses. In an embodiment, the apparatus 1100 may be the storage system manager 104 in FIG. 1 for a part thereof.

As shown in FIG. 11, the apparatus 1100 may comprise: a second detecting unit 1101 configured to detect a second request for shrinking the cache devices; and a shrinking unit 1102 configured to: in response to detecting the second request, remove the first cache device in the first cache device group from the plurality of cache devices, or remove at least one cache device in the second cache device group from the plurality of cache devices by the using subunits 11021-11023, wherein the subunit 11021 is a locking unit configured to prohibit a write operation for at least one cache device; the subunit 11022 is a flushing unit configured to duplicate a dirty page in the at least one cache device to the storage device in the storage system; and the subunit 11023 is a removing unit configured to remove the at least one cache device. In an embodiment, the apparatus may execute the method 500 or 501 described with reference to FIGS. 5a-5b, so the shrinking operation described with reference to the methods 500 and 501 also apply to the shrinking unit 1102 and will not be detailed here.

In another embodiment, the apparatus 1100 may further comprise a selecting unit 1103 configured to select cache devices one by one from the list of the candidate cache devices for removing from the plurality of cache devices; and an iterative controlling unit 1104 configured to cause to performing the obtaining and removing operations for each cache device in the list of the candidate cache devices. For example, the iterative controlling unit 1104 may be configured to update the list of the candidate cache devices by deleting the selected device from the list of the candidate cache devices, and check whether the list of the candidate cache devices is empty, and if the list is not empty, cause the selecting unit 1103 and shrinking unit 1102 to execute operations.

Figure 12:
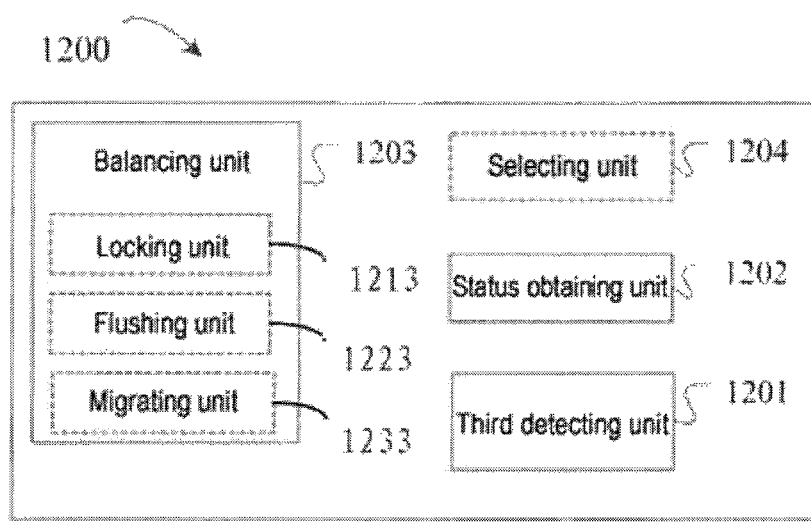
FIG. 12 illustrates a schematic structural diagram of a further apparatus for managing a plurality of cache devices according to an embodiment of the present disclosure.

FIG. 12 illustrates a schematic structural diagram of another apparatus 1200 for managing a plurality of cache devices according to an embodiment of the present disclosure. The plurality of cache devices comprise, for example, the first cache device group 101 serving the read request and the second cache device group 102 serving the write request in FIG. 1.

The apparatus 1200 may execute the methods 600 and 601 described with reference to FIGS. 6a-6b, but is not limited to executing the methods. Likewise, the methods 600 and 601 may be executed by the apparatus 1200, but are not limited to being executed by the apparatus 1200. For example, at least some operations of the method 600 or 601 may be executed by other apparatuses. In an embodiment, the apparatus 1200 may be the storage system manager 104 in FIG. 1 or a part thereof.

As shown in FIG. 12, the apparatus 1200 may comprise: a third detecting unit 1201 configured to detect a third request for balancing the first cache device group and second cache device group; and a status obtaining unit 1202 configured, in response to detecting the third request, to obtain status information of the plurality of cache devices, the status information indicating at least one of load status, online time and usage situation of the storage space of the plurality of cache devices; and a balancing unit 1203 configured to migrating a cache device between the first cache device group and second cache device group based on the obtained status information of the plurality of cache devices.

As stated above in conjunction with method 600, the third request (namely, balance trigger) may be at least one of the following: a periodical scheduling trigger, a trigger input by the user, and a threshold-based trigger. Depictions about the third request in conjunction with the methods 600 and 601 also apply here and are not repeated here for brevity purpose. In addition, depictions of various operations provided with reference to the block 630 of the method 600 and blocks 631-639 of the method 601 also apply to the balancing unit 1203.

Optionally, in an embodiment, the apparatus 1200 may further comprise a selecting unit 1204 configured to select a cache device to be migrated from the first cache device group or second cache device group based on the determined migration direction and at least one of the obtained load status, online time and usage status of the storage space of the plurality of cache devices.

In another embodiment, the balancing unit 1203 may be configured to execute migration of a cache device in the second cache device group through subunits 1213, 1223 and 1233, wherein the locking unit 1213 is configured to lock the cache device; the flushing unit 1223 configured to flush the data of the cache device to the bottom drive; and the migrating unit 1233 is configured to perform migration of the cache device. In a further embodiment, when it is determined that the cache device is to be migrated from the first cache device group to the second cache group, the balancing unit 1203 may directly perform the migration operation of the cache device through the migrating unit 1233 without requiring actions from the locking unit 1213 and flushing unit 1223. The embodiment enables to perform different processing for cache devices in different groups and reduce unnecessary delay.

Figure 13:
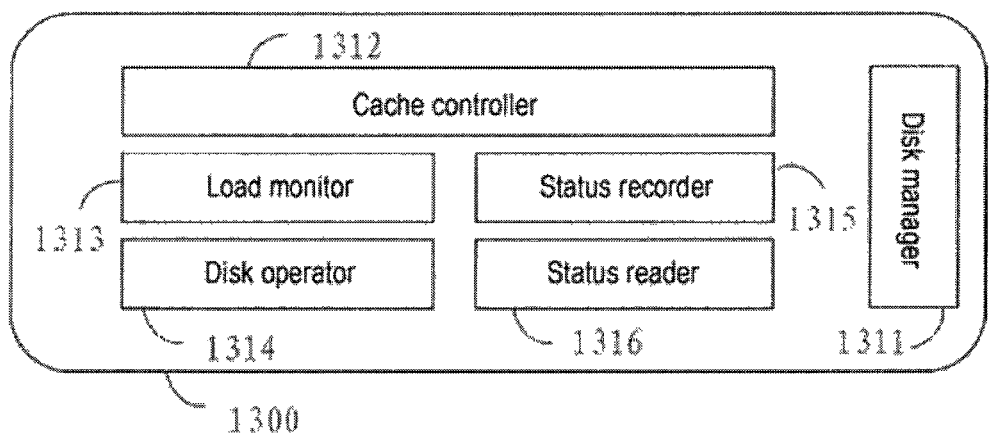
FIG. 13 illustrates a schematic structural diagram of another apparatus for managing a plurality of cache devices according to an embodiment of the present disclosure.

In a further embodiment, functions of one or more apparatuses of apparatus 1000, 1100 and 1200 may be implemented via a single apparatus 1300. FIG. 13 shows a schematic diagram of a structure of the apparatus 1300. The apparatus 1300 shown in FIG. 13 may comprise a disk manager 1311, a cache controller 1312, a load monitor 1313, a disk operator 1313, a status recorder 1315 and a status reader 1316.

The disk manager 1311 is configured to manage a plurality of cache devices (e.g., disks) and store distribution record of cache devices in each cache device group (e.g., disks in the RW group and disks in RO group) in the plurality of cache devices. When performing expanding or shrinking operation for the plurality of cache devices, the disk manager 1311 is configured to perform relevant operations for the disk. For example, in an embodiment, the disk manager 1311 may be configured to execute at least part of operations of one or more units of the expanding unit 1003, shrinking unit 1102 and balancing unit 1203 in FIGS. 10-12.

The cache controller 1312 is configured to distribute the plurality of cache devices (e.g., disks), and it may perform distribution operation based on, for example, load status and threshold status. The controller may monitor the load status during run by activating the load monitor, and execute the distribution operation according to actual load status.

The load monitor 1313 is configured to monitor a running status and a threshold. When the balance trigger occurs (namely, the third request is detected), distribution operation is caused on a plurality of cache devices, and a ratio of for example the cache devices of RW group to the cache devices of RO group is adjusted. In an embodiment, the cache controller 1312 and load monitor 1213 may be a part of at least one of the status obtaining units 1002 and 1202 in FIGS. 10 and 12.

The disk operator 1314 is configured to execute distribution operation. It may change the disk status and for example move the disks of the RW group into the RO group, remove disks of the RO group from the RO group, or migrate the disks of the RO group to the RW group. In an embodiment, the operation may be performed by invoking the disk manager 1311.

The status recorder 1315 is configured to record running status of a disk, including load status, usage situation of the disk and the like. The status reader 1316 is configured to provide a read Application Program Interface (API) for other modules. It may further return possible operations according to current load status, usage situation of the disk and the like, for example, indicate whether to move disks between the RW group and RO group or whether need to flush data. In an embodiment, the status reader 1316 may also be a part of the status obtaining unit 1002 or 1202, or a part of the first detecting unit 1001, second detecting unit 1101 or third detecting unit 1201.

In an embodiment, the apparatus 1300 may be the storage system manager 104 in FIG. 1 or a part thereof.

As can be appreciated by those skilled in the art, FIGS. 10-13 only show an example structure. Embodiments of the present disclosure may also implement the apparatus for managing the storage system and the apparatus for managing the plurality of cache devices with other structures different from those shown in FIGS. 10-13. For example, the apparatus 1000-1300 may further include other units not shown in FIGS. 10-13; and in some embodiment, some units in FIGS. 10-13 may be omitted. Furthermore, in some embodiments, operations implemented by one unit in FIGS. 10-13 may also be implemented in a distributed way in a plurality of units; similarly, in some other embodiments, operations performed by multiple units in FIGS. 10-13 may also be implemented by a single component.

Functions of elements of the apparatus shown in FIGS. 10-13 may be provided by using software, dedicated hardware, and hardware associated with proper software and being capable of executing software, or firmware, or a combination thereof. When the functions are provided by a processor, they may be provided by a single dedicated processor, a single shared processor or a plurality of separate processors. In addition, the term "processor" may include but is not limited to a digital signal processor (DSP) hardware, a network processor, an application-specific integrated circuit (ASIC), a field programmable gate array (FPGA), a Read Only Memory (ROM) for storing software, Radom Access Memory (RAM), and a non-volatile memory. It may further comprise other conventional and/or customized hardware.

Figure 14:
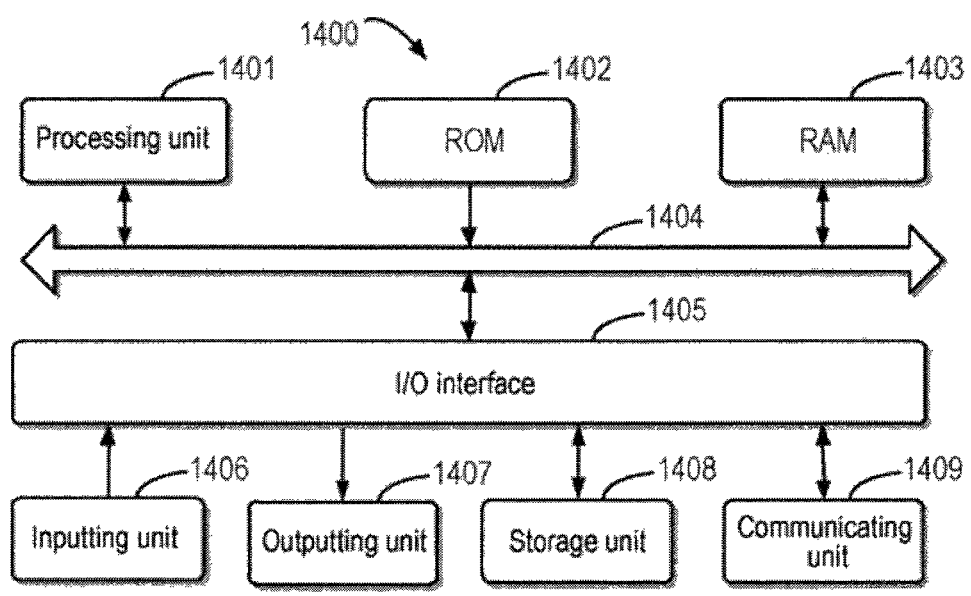
FIG. 14 illustrates an example structural diagram of a device that may implement an embodiment of the present disclosure.

FIG. 14 illustrates an example structural diagram of an apparatus 1400 that may implement an embodiment of the present disclosure. As shown in the figure, the apparatus 1400 comprises a processing unit (e.g., but not limited to a CPU) 1401 which is capable of performing various suitable actions and processes in accordance with computer program instructions stored in a read only memory (ROM) 1402 or computer program instructions from a storage unit 1408 (e.g., computer program instructions loaded from the storage unit 1408 to a random access memory (RAM) 1403). Various programs and data needed in operations of the apparatus 1400 may also be stored in the RAM 1403. The processing unit 1401, the ROM 1402 and the RAM 1403 are connected to one another via a bus 1404. An input/output (I/O) interface 1405 is also connected to the bus 1404.

A plurality of components of the apparatus 1400 are connected to the I/O interface 1405, and the plurality of components include: an inputting unit 1406 (e.g., a keyboard, a mouse, or the like), an outputting unit 1407 (e.g., various displays and loudspeakers), the storage unit 1408 (e.g., a magnetic disk, an optical disk or the like), and a communicating unit 1409 (e.g., a network card, a modem, a radio communication transceiver). The communicating unit 1409 allows the apparatus 1400 to exchange information/data with other devices via a computer network such as Internet and/or various telecommunication networks.

The above-described procedures and processes, e.g., any method shown in FIG. 3*a*-FIG. 6*b*, may be performed by the CPU 1301. For example, in some embodiments, any method in FIG. 3*a*-FIG. 6*b* may be implemented as a computer software program, which is tangibly included in a machine-readable medium such as storage unit 1408. In some embodiments, part or all of the computer program may be loaded and/or installed on the apparatus 1400 via the ROM 1402 and/or the communicating unit 1409. When the computer program is uploaded to the RAM 1403 and executed by the processing unit 1401, one or more steps of any method described above with reference to FIGS. 3*a*-6*b* may be implemented.

Those skilled in the art can easily appreciate that blocks or steps in the above methods may be executed by a programmed computer. In the present disclosure, some embodiments are intended to cover a program storage device, for example, a digital data storage medium, which stores an instruction program which is machine or computer-readable and may be executable by an encoding machine or a computer, wherein the instruction executes some or all steps of the above methods. The program storage device may be, for example, a digital memory, a magnetic storage medium such as a magnetic disk or magnetic tape, a hard disk driver or optically-readable digital data storage medium. The embodiments are further intended to cover a computer programmed to execute steps of the above method.

In addition, those skilled in the art should appreciate that the description and figures are only intended to illustrate the principle of the present disclosure. Hence, it should be appreciated that those skilled in the art can design various arrangements, though not explicitly described or shown herein though, reflecting principles of the present disclosure and are included in the spirit and scope of the present disclosure. Besides, all examples illustrated herein are mainly intended explicitly for teaching purposes so as to help readers to understand the principle of the embodiments of the present disclosure and the concepts contributed by the inventors for advancing the field, while should not be interpreted as limiting to examples and conditions elaborated herein. Meanwhile, all the statements describing principles, aspects and embodiments of the present disclosure also intend to include also their equivalents.

We claim:

1. A method of managing a plurality of cache devices, the plurality of cache devices including a first cache device group serving a read request and a second cache device group serving a write request, the method comprising:
  detecting a first request received from a user for expanding the plurality of cache devices;
  in response to and after detecting the first request from the user, obtaining status information of the plurality of cache devices, the status information indicating at least one of: a load status and a usage situation of a storage space;
  adding, based on the obtained status information, a new cache device into the first cache device group or the second cache device group, the new cache device previously being separate from the first cache device group and the second cache device group;

determining a migration direction between the first cache device group and the second cache device group based on values of IOPs (I/O's per second) of the first cache device group and the second cache device group; and performing migration of a cache device, wherein performing migration of the cache device moves the cache device in the determined migration direction and changes an attribute of the cache device between read-write and read-only.

2. The method according to claim 1, wherein the first request indicates a list of a plurality of candidate cache devices, and wherein adding the new cache device comprises:

selecting new cache devices one by one from the list of the candidate cache devices for adding the new cache device into the first cache device group or the second cache device group.

3. The method according to claim 1, wherein the status information indicates the load status of the plurality of cache devices, and adding the new cache device comprises:

obtaining, based on the load status of the plurality of cache devices, a first load of the first cache device group and a second load of the second cache device group;

in response to a difference between the first load and the second load or a ratio of the first load to the second load exceeds a predetermined threshold, adding the new cache device into the first cache device group; and in response to the difference between the first load and the second load or the ratio of the first load to the second load is below the predetermined threshold, adding the new cache device into the second cache device group.

4. The method according to claim 1, wherein the status information indicates the usage situation of the storage space of the plurality of cache devices, and adding the new cache device comprises:

determining, based on the usage situation of the storage space of the plurality of cache devices, a usage rate of the storage space of the second cache device group;

in response to the usage rate of the storage space of the second cache device group exceeds a first threshold, adding the new cache device into the second cache device group; and in response to the usage rate of the storage space of the second cache device group is below the first threshold, adding the new cache devices into the first cache device group.

5. The method according to claim 1, wherein the status information indicates the usage situation of the storage space of the plurality of cache devices, and adding the new cache device comprises:

determining, based on the usage situation of the storage space of the plurality of cache devices, an idle rate of the storage space of the second cache device group;

in response to the idle rate of the storage space of the second cache device group is below a second threshold, adding the new cache device into the second cache device group; and in response to the idle rate of the storage space of the second cache device group is above the second threshold, adding the new cache device into the first cache device group.

6. The method according to claim 1, wherein a cache device in the first cache device group comprises a first solid-state disk (SSD) pair, and each SSD in the first SSD pair serves the read request independently.

7. The method according to claim 1, further comprising:

receiving a balance trigger request for balancing the first cache device group and the second cache device group; and in response to detecting the balance trigger request, obtaining new status information of the plurality of cache devices, wherein performing migration of the cache device between the first cache device group and the second cache device group is based on the obtained status information of the plurality of cache devices.

8. The method of claim 1, further comprising storing a data structure to maintain the attribute of the cache device, the data structure including:

a type flag to indicate the attribute;

at least one disk serial number of the cache device;

an online time indicator of the cache device;

a load status indicator of the cache device; and a disk space usage indicator of the cache device.

9. A method of managing a plurality of cache devices in a storage system, the plurality of cache devices including a first cache device group serving a read request and a second cache device group serving a write request, the method comprising:

detecting a shrinking request from a user for shrinking the cache devices; and in response to and after detecting the shrinking request from the user, removing at least one cache device in the second cache device group from the plurality of cache devices by a removal procedure configured to:

determine whether the at least one cache device is in the first cache device group or the second cache device group;

in response to a determination that the at least one cache device is in the second cache device group, prohibit a write operation for the at least one cache device;

duplicate a dirty page in the at least one cache device to a storage device of the storage system; and remove the at least one cache device;

in response to a determination that the at least one cache device is in the first cache device group, remove the at least one cache device without prohibiting a write operation or duplicating a dirty page; and determine a migration direction for migrating a cache device between the first cache device group and the second cache device group based on values of IOPs (I/O's per second) of the first cache device group and the second cache device group, performing migration of a cache device, wherein performing migration of the cache device moves the cache device in the determined migration direction and changes an attribute of the cache device between read-write and read-only.

10. The method according to claim 9, wherein the shrinking request indicates a list of candidate cache devices, and the method further comprises:

selecting cache devices one by one from the list of the candidate cache devices for removing the selected cache devices from the plurality of cache devices.

11. The method according to claim 9, wherein a cache device in the first cache device group comprises a first solid-state disk (SSD) pair, and each SSD in the first SSD pair serves the read request independently.

12. A storage system, comprising:
a storage device;
a plurality of cache devices including a first cache device group serving a read request and a second cache device group serving a write request; and
a storage system manager configured to execute the method of managing the plurality of cache devices, the method comprising:
  detecting a first request received from a user for expanding the plurality of cache devices;
  in response to and after detecting the first request from the user, obtaining status information of the plurality of cache devices, the status information indicating at least one of: a load status and a usage situation of a storage space;
adding, based on the obtained status information, a new cache device into the first cache device group or the second cache device group, the new cache device previously being separate from the first cache device group and the second cache device group; and
determining a migration direction between the first cache device group and the second cache device group based on values of IOPs (I/O's per second) of the first cache device group and the second cache device group; and
performing migration of a cache device, wherein performing migration of the cache device moves the cache device in the determined migration direction and changes an attribute of the cache device between read-write and read-only.

13. The storage system of claim 12, wherein the first request indicates a list of a plurality of candidate cache devices, and wherein adding the new cache device comprises:
  selecting new cache devices one by one from the list of the candidate cache devices for adding the new cache device into the first cache device group or the second cache device group.

14. The storage system of claim 12, wherein the status information indicates the load status of the plurality of cache devices, and adding the new cache device comprises:
  obtaining, based on the load status of the plurality of cache device, a first load of the first cache device group and a second load of the second cache device group;
  in response to a difference between the first load and the second load or a ratio of the first load to the second load exceeds a predetermined threshold, adding the new cache device into the first cache device group; and
  in response to the difference between the first load and the second load or the ratio of the first load to the second load is below the predetermined threshold, adding the new cache device into the second cache device group.

15. The storage system of claim 12, wherein the status information indicates the usage situation of the storage space of the plurality of cache devices, and adding the new cache device comprises:
  determining, based on the usage situation of the storage space of the plurality of cache devices, a usage rate of the storage space of the second cache device group;
  in response to the usage rate of the storage space of the second cache device group exceeds a first threshold, adding the new cache device into the second cache device group; and
  in response to the usage rate of the storage space of the second cache device group is below the first threshold, adding the new cache devices into the first cache device group.

16. The storage system of claim 12, wherein the status information indicates the usage situation of the storage space of the plurality of cache devices, and adding the new cache device comprises:
  determining, based on the usage situation of the storage space of the plurality of cache devices, an idle rate of the storage space of the second cache device group;
  in response to the idle rate of the storage space of the second cache device group is below a second threshold, adding the new cache device into the second cache device group; and
  in response to the idle rate of the storage space of the second cache device group is above the second threshold, adding the new cache device into the first cache device group.

17. The storage system of claim 12, wherein a cache device in the first cache device group comprises a first solid-state disk (SSD) pair, and each SSD in the first SSD pair serves the read request independently.

18. The storage system of claim 12, wherein the method further comprises:
  detecting a second request for shrinking the cache devices; and
  in response to detecting the second request,
  removing at least one cache device in the second cache device group from the plurality of cache devices by:
    prohibiting a write operation for the at least one cache device;
    duplicating a dirty page in the at least one cache device to a storage device of the storage system; and
    removing the at least one cache device.

19. The storage system of claim 12, wherein the method further comprises:
  detecting a second request for shrinking the cache devices; and
  in response to detecting the second request, removing a first cache device in the first cache device group from the plurality of cache devices.

* * * * *